United States Patent [19]
Willard et al.

[11] 3,851,104
[45] Nov. 26, 1974

[54] DIGITAL COMMUNICATIONS SYSTEM

[75] Inventors: David G. Willard, Hollis, N.H.; Michael S. Cogan, Saugus, Mass.; Maurice G. Vacherot, Billerica, Mass.; John W. Shay, Carlisle, Mass.

[73] Assignee: The Mitre Corporation, Bedford, Mass.

[22] Filed: Apr. 11, 1973

[21] Appl. No.: 350,043

[52] U.S. Cl....... 179/15 BY, 179/15 BA, 179/15 BV
[51] Int. Cl. .......... H04j 3/04
[58] Field of Search...... 179/15 BA, 15 BU, 15 BW, 179/15 BY

[56] References Cited

UNITED STATES PATENTS 3,700,820 10/1972 Blasbalg .................. 179/15 BV
3,749,841 7/1973 Cohen .................. 179/15 BA
3,760,106 9/1973 Monti .................. 179/15 BA

*Primary Examiner*—Ralph D. Blakeslee
*Attorney, Agent, or Firm*—Kenway & Jenny

[57] ABSTRACT

A time division multiple access communications system which provides communication linkages between remote subscriber terminals. The communications system comprises a plurality of remote terminals interconnected by a common wideband signal path and a central control terminal. A repetitive framed message signal format is maintained by the control terminal to provide a predetermined average time required for access to the signal path for each remote terminal. Communication links over the channel between remote terminals are further provided, wherein the links comprise adaptively allocated portions of the channel spectrum in response to request signals from the various remote terminals.

20 Claims, 13 Drawing Figures

DIGITAL COMMUNICATIONS SYSTEM

BACKGROUND OF THE INVENTION

This invention relates to communications systems, and more particularly to time division multiple access digital communications system.

There are many forms of time division multiple access communications systems known in the art. These systems basically provide a single information bus for transferring in a repetitive framed sequence various portions of digital message signals between remote terminals. It is further known in the art to provide a central control terminal for control the flow of message signals among the various remote terminals so as to provide an efficient communications system. Such high-speed distributive communications systems may use a polling method of access in which each subscriber is interrogated in turn by a control terminal to determine the times when the respective ones of the subscribers desire data service, for example, see the Farmer-Newhall distributive switching system described in the "Proceedings of the ACM Symposium on the Optimization of Data Communications Systems," 13-16 October 1969. In this and other similar type systems, the central control terminal provides for a rigid formating of messages and an inflexible set of system constraints controlling the time periods at which the various remote terminals may be effective to gain access (hereinafter referred to as access times) to the communication path. In addition, the various data rates at which the individual remote terminals may transmit message signals is hard-wired into the system, i.e. a predetermined portion of the channel bandwidth is allocated to each of the remote terminals.

The constraints on the access time to the signal path for the various remote terminals are imposed in most systems through a polling technique used to determine which terminals, if any, wish to establish a communication link with which other terminal at any given time. Generally, such communications systems using this technique reserve a portion of their repetitive framed message sequence for sequentially interrogating in successive frame periods all of the remote terminals connected to the common signal path. This polling technique of determining which terminals to link is hard-wired into the system, and once the system is configured, each of the remote terminals may only be interrogated for the specific portion of the frame period allocated for interrogation. As a consequence of this polling technique, the system is constrained to conform to the substantially rigid rules which govern when the terminals may be linked together. For example, in such a system with forty remote terminals connected to a signal path having a single interrogation time slot during each frame period, the mean access time for a terminal would be twenty frame periods. This access time may only be reduced by changing the format of the repetitive framed sequence to increase the number of interrogation time slots per frame period. This method thus presents a substantial disadvantage in that changed circumstances of a terminal connected to the path may require that such a terminal have a larger share of the frame time so that a proportionately decreased access time for the respective terminal may be realized.

A further inflexibility is imposed on such communications systems as described above in that the data rate available for the various terminals over the communication path is also hard-wired into the system configuration. Again, changed circumstances of a terminal connected to the path may require certain terminals to have a larger portion of the frame period devoted to its communication linkages to accomodate an increased data rate requirement. In such communications systems known in the art, a change to allow such an increased bandwidth for a terminal would require a substantial effort and accompanying expense in reconfiguring the message and frame period formats. Thus, the characteristics of such systems which constrain the data rates for the various terminals to a predetermined limit inherently provide a substantial disadvantage for those systems.

SUMMARY OF THE INVENTION

Accordingly, it is one of the objects of this invention to provide a new and improved time division multiple access digital communications system.

Another object is to provide a new and improved method and system for linking two or more remote data terminals in a time division multiple access communications system with an adaptively controlled access time responsive to predetermined requirements for each remote terminal.

A further object is to provide a new and improved method and system for linking two or more remote data terminals over a common signal path wherein selectable portions of the signal path spectrum are adaptively allocated to the various linked terminal pairs in response to terminal request signals from the respective ones of remote terminals.

In the present invention, a plurality of remote data terminals is interconnected via a common wideband signal path and a central control terminal. The central control terminal maintains a framed message format for communications signals over the path, with the format comprising multiple bit digital message signals, each signal being disposed in a one of a plurality of time slots in a repetitive framed time sequence.

The central control terminal is effective to receive digital signals from the remote terminals and for transmitting digital signals to the remote terminals. The wideband signal path connected to the control terminal includes a pair of communication channels, the first for transmission of digital signals directed away from the control terminal and toward the remote terminals, and the second for signals directed toward the control terminal and originating in the remote terminals. Each of the plurality of remote subscriber data terminals has a signal input connected to the outbound channel from the central control terminal and a signal output connected to the inbound channel of the signal path. In addition, each of the terminals has an associated binary address word.

The format of the multiple bit digital message signals is controlled so that each repetitive framed sequences is subdivided into a predetermined number of time periods or slots, each slot having a duration equal to a predetermined number of bit periods at the system data rate. The digital signal in each time slot constitutes a basic message signal for the system. The central control terminal is further effective to maintain a record of the various time slots and the class of message signal associated therewith.

The central control terminal transmits a one of a first class of message signals, frame synchronization signals, during each of a predetermined number of time slots of each frame period over the outbound channel of the signal path. These frame synchronization signals are received by all terminals connected to the signal path and are used in each terminal to provide synchronization of remote terminal operation.

A second class of signals is also generated by the central control terminal. This class of signals (referred to hereinafter as request slot assignment signals) is also generated during predetermined slots in the framed sequence. Successive ones of the signals of this class are addressed via an included binary word to the respective ones of the remote terminals having the corresponding associated binary address. Each of these signals further includes binary words for assigning to the respective ones of the successively addressed remote terminals a time slot and spacing between subsequent time slots within each repetitive frame to define the set of time slots during which the respective terminals may generate on the inbound channel an appropriate signal (referred to as a request signal) for requesting the establishment of (sign-on) or the termination of (sign-off) a communications link between the respective terminal and a desired receiver terminal. In this manner, the binary words for assigning request slots may provide for a remote terminal to have a selectable number of time slots within a frame for use by that terminal along in becoming effectively linked with a desired receiver terminal. As a result, the mean time required by a remote terminal for access to the signal path to request linkage to a receiver terminal is dependent on the number of slots assigned to the remote terminal. As the number of such assigned slots for a terminal is increased, the access time becomes correspondingly smaller. The number of these sign-on request slots which are available at each terminal for the overall system is, of course, constrained by the total number of slots within each frame. However, the allocation of the various slots for requests within each frame among the various terminals may have an arbitrary level of flexibility, since a revised assignment of request slots to a terminal may be accomplished merely by changing the binary words in the request slot assignment signal.

In response to a remote terminal generating a sign-on request signal in one of its correspondingly assigned request slots, the central control terminal is effective to transmit on the outbound channel a sign-on response signal addressed to the requesting terminal (via an included binary address word) assigning to that terminal, through binary word within the response signal, a time slot within a frame and spacing of subsequent time slots, all of such slots, or data slots, to be used by the requesting terminal for transmitting message signals on the inbound channel of the transmission line destined for the linked receiver terminal. The number of slots during each frame which are effectively assigned data is designated by binary words which are dependent on the data rate desired by the transmitting terminal. The desired rate is indicated to the central control terminal by an appropriate binary word in the sign-on request signal. Thus, in response to the receipt of a sign-on request signal, the central control terminal is effective to transmit a sign-on response signal on the outgoing channel addressed to the request terminal. Subsequently, in the assigned slots for data transmission, the requesting terminal transmits data signals in the assigned data slots addressed to the desired receiver terminal and including data intended for that terminal. Thus, the number of assigned slots during each framed repetitive time sequence which are available to a requesting terminal for the transmission of data to the intended receiver terminal, controls the data rate at which communication from the requesting to the intended receiver terminals may take place. It will be understood that this data rate is directly responsive to the requesting terminals signals as transmitted to the central control terminal.

Addressed data signals are continually transmitted in the assigned data slots by the requesting terminal during successive frame periods until it is desired by that terminal to terminate the communication link. At that time, the requesting terminal generates a sign-off request signal and transmits this signal on the inbound channel to the central control terminal. The central control terminal responds by generating a sign-off response signal addressed to the requesting terminal (via a sign-off response signal addressed to the requesting terminal (via an included binary address word) and transmitting this signal via the outbound channel to that terminal. At that time the communication link between the requesting and intended receiver terminal is terminated.

Thus, in accordance with the present invention, a desired average access time for a remote terminal may be attained by allocating a controlled portion of the frame period to that terminal for initiating communication linkages. As a result, those subscribers requiring fast access are allocated more request slots than those with slower access requirements. The system in accordance with the present invention can also deny access to any subscriber terminal by deleting request slots to any individual terminal. In addition, the requesting terminal may also obtain a desired portion of the channel bandwidth for its communications operations by requesting the control terminal to set aside a sufficient number of time slots for that requesting terminal so as to attain a desired data rate over the channel. This latter property of the present invention provides for an adaptive data rate communication link over the channel between remote terminal pairs in response to request signals from the various remote terminals.

BRIEF DESCRIPTION OF THE DRAWINGS

The foregoing and other objects of this invention, the various features thereof, as well as the invention itself may be more fully understood from the following description when read together with the accompanying drawing in which.

DESCRIPTION OF THE PREFERRED EMBODIMENT

Figure 1:
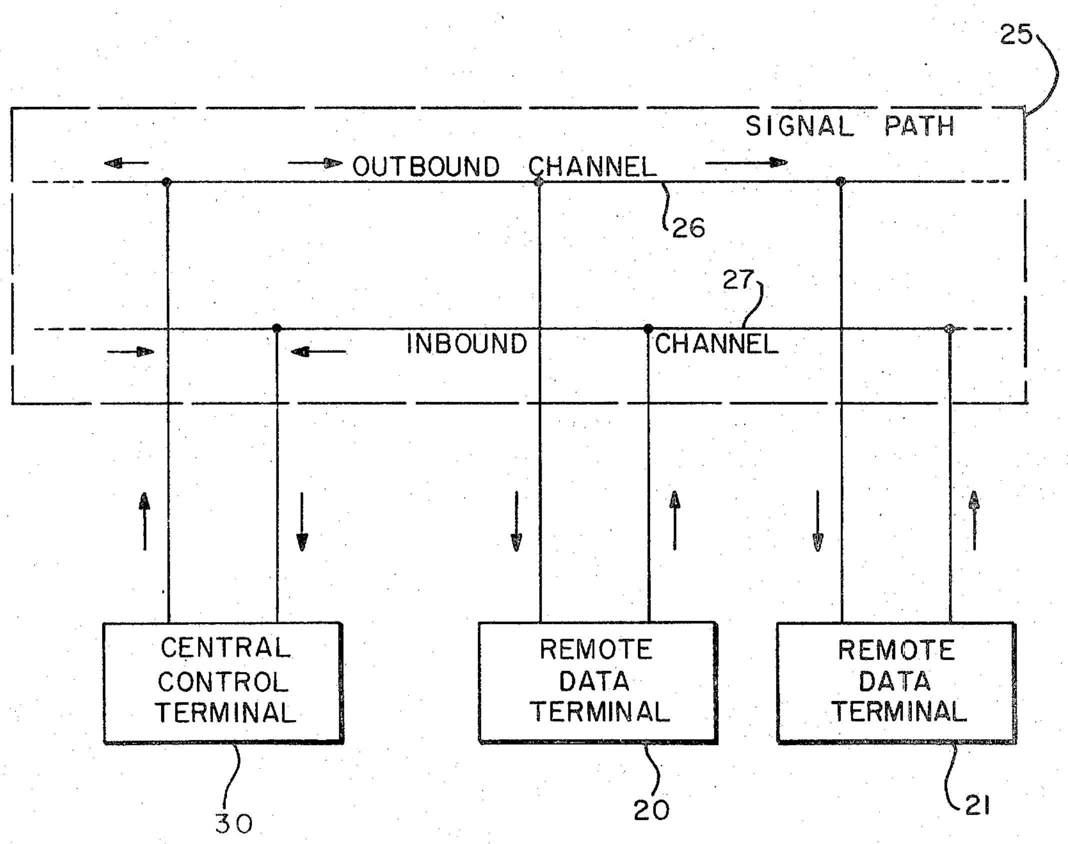
FIG. 1 shows a block diagram form a communication system in accordance with the invention.

A communications system embodying the present invention is shown in FIG. 1 to include a plurality of remote data terminals interconnected via a common signal path 25 to a central control terminal 30. Two remote data terminals 20 and 21 are shown explicitly in FIG. 1. Signal path 25 comprises two channels, a first outbound channel, 26, which connects the output of control terminal 30 to the inputs of all data terminals connected to the signal path 25, and second, an inbound channel 27 which connects all of the outputs of the data terminals to the input of control terminal 30. Broadly speaking, a repetitive framed sequence of digital signals are transmitted on path 25 between the data terminals in a timed division multiple access format. Central control terminal 30 establishes synchronization of operation in all terminals connected to the path 25 by periodically transmitting a frame synchronization signal on channel 26, which signal is received by all data terminals and is used to provide a time-base for internal operations of the respective data terminals. Each of the data terminals is provided with an associated binary address word. All message signals intended for the various terminals which are transmitted on the outbound channel 26 by control terminal 30 are preceded by the individual intended receiver terminal or by a multiple terminal address word. In the latter case, all terminals connected to the signal path 25 are affective to process the message signal accompanying the multiple terminal address word. In this case, a portion of the address word is used for identification by the respective terminals, of the category of the message signal. For example, a newspaper service might be provided to all terminals.

Control terminal 30 also sends out at repetitive intervals within a frame period message signals addressed to the various ones of the data terminals, which message signals comprise a request slot assignment signal for assigning to the various terminals a predetermined number of time periods or slots, within the repetitive framed sequence. During the respective ones of the assigned request slots, each of the respective data terminals may transmit a signal on inbound channel 27 to request the establishment of a communication link between the requesting terminal and an intended receiving terminal. A link is effectively established when control terminal 30 allocates to the requesting terminal a plurality of time slots within the frame period for transmission of data signals by that terminal to the intended receiver terminal. Central control terminal 30 maintains a record of time slots within the frame period which have been assigned previously for various terminal linkages and request signals and a record of available, or presently unused time slots. In response to the receipt on inbound channel 27 of a sign-on request signal from a data terminal in one of its assigned time slots, control terminal 30 is effective to assign a number of time slots during the frame period to the present requesting data terminal for its data signals, thereby establishing a communication link with the intended data receiver terminal. The particular number of slots assigned for a particular communication link is dependent on the requested data rate which is denoted by the requesting data terminal in its sign-on signal.

Central control terminal 30 then transmits on outbound channel 26 a sign-on response signal, which signal includes a binary word corresponding to the requesting terminal address and also a pair of binary words denoting slots within a frame which are assigned for the ensuing communication linkage between the requesting and intended receiving terminals which is effectuated by a succession of one or more data signals in the appropriately assigned slots. A first of these latter signals is transmitted by the requesting data terminal in a one of the aforedescribed time slots assigned by the sign-on response signals, and includes a sequence of data bits intended for transmission to the intended receiver data terminal. The requesting data terminal similarly transmits data signal on inbound channel 27 (which signals have the above described format) during subsequent assigned data slots in the current frame period and in the corresponding assigned time slots in subsequent frame periods on inbound channel 27.

The data signals are received by central control terminal 30 and retransmitted in the same form as received, i.e. having the intended receiver terminal address prefixing a sequence of data bits, on the outbound channel 26. The data signals so applied to channel 26 are selectively received by the data terminal whose associated binary word address corresponds to the address word prefix in the data signal. All other terminals are ineffective to receive such signals which are not prefixed with their respective individual terminal address word except when a multiple terminal address word is received. (In the latter case, all terminals receive the signal transmitted on outbound channel 26.)

The data transmission operation continues until the requesting data terminal indicates that it wishes to terminate the communication link with the receiver data terminal. This indication is provided to central control terminal 30 by a sign-off request signal generated by the requesting terminal which is transmitted via inbound channel 27 to control terminal 30. The sign-off request signal is transmitted in one of the assigned request slots for the requesting data terminal, and includes the addresses of the requesting and intended receiver data terminals, as well as a signal indicating a sign-off request. Control terminal 30 responds by disassociating in its time slot record the time slots previously assigned to the requesting terminal, and transmitting a sign-off response signal via output channel 26. The sign-off response signal is prefixed by the requesting data terminal address word, and includes a control signal indicating to the requesting data terminal that the slots assignments for that terminal are no longer effective. No such signal is necessary to be addressed to the receiving data terminal, since all data terminals connected to the signal path 25 may selectively receive only those signals that are prefixed with their address word (or a multiple address word).

The above described sequence of operations presents a broad view of the operation of the herein described embodiment. A more detailed description follows.

It will be noted in the above description, that the request slot assignment signal effectively controls the average time required to establish a communication link for a given pair of terminals. This is accomplished by providing each terminal with a predetermined proportion of the number of slots per frame during which time the respective terminal may transmit a sign-on request signal. In this manner a communications system may avoid being hard-wired to establish an inflexible schedule of access times for the respective terminals connected to a signal path 25.

In the hereindescribed embodiment, the request slot assignment signal includes two binary words, the first of which establishes the number of the first slot in the framed sequence during which time the addressed terminal may issue a sign-on request signal, and the second of which represents the subsequent spacing within a frame period of additional slots which are also allocated to the respective terminal for the transmission of sign-on request signals. Thus, these two words specifically delineate a predetermined proportion of the frame period which is allocated to the respective ones of the terminals. It will be understood that in other embodiments the specification of the assigned slots may have some other form.

The central control terminal 30 sequentially addresses each of the terminals connected to signal path 25 over a multiple frame interval and transmits a request slot assignment signal for the respective ones of the terminals 20. Thus in the present embodiment, it is relatively easy to vary the average access time afforded the respective ones of the terminals 20 since all that is required is to change the binary words in the respective ones of the request slot assignment signals transmitted by terminal 30. It will be further understood that the number of slots per frame afforded each terminal is directly related to the average access time, i.e. time required to establish a link between two given terminals.

The system of FIG. 1 also provides for a dynamic allocation of the portions of the channel capacity to the various pairs of linked terminals. The sign-on request signal issued by a requesting terminal in a one of its assigned time slots includes a binary word control signal indicating a desired data rate to be provided by a link between the requesting and intended receiver terminals. The binary word is in the form of a number indicating the spacing between slots to be used for transmission during a frame. This number is directly related to the number of slots per frame which is desired by the requesting terminal. Since a signal time slot always provides a constant number of data bits per slot, the data rate for a linked data terminal pair is directly related to the number of data slots per frame assigned to the transmitting data terminal.

The central control terminal 30 selects and assigns from its record the appropriate number of slots in keeping with the requested number disclosed by the sign-on request signal. The sign-on response signal from the control terminal 30 is effective to identify for the requesting terminal the particular slots assigned for data transmission. The sign-on response signal designates these assigned slots by two binary words, in a fashion similar to the request assignment signal, that is, a first word representing the first slot within a frame and the second word representing the subsequent spacing for later slots within the frame.

In this manner, the present invention may be used to dynamically allocate the channel capacity in response to request signals issued by the various remote terminals. That is to say, each of the remote terminals may request a certain portion of the signal path data capacity to be used in its linkage with another terminal. This is accomplished by requesting a certain data rate in the sign-on request signal.

An exemplary embodiment will now be described for the system shown in FIG. 1 which will be assumed to have the following parameters constraining the transmitted signals:

2.56 seconds/frame
8,192 slots/frame
256 bits/slot (1 message/slot)
819,200 bits/second Each slot may contain a message signal comprising 256 bit positions, the first and last four of which are guard bits. The guard bits provide a margin of error for the inexact placement of messages by the remote terminals within the assigned slots, such inexactitudes being due to uneven transit delays, and the like. The central control terminal 30 provides binary zeroes in the guard bit locations. However, the remote data terminals do not transmit bits for the guard bit positions in message signals so that the inexact slot sequencing by remote terminals will not cause mutual interference by overlapping messages so long as each remote terminal maintains a slot number count which is accurate within four bits.

It will be understood that each remote terminal comprises a receive slot counter for maintaining a count state corresponding to the slot number of each received message signal and a transmit slot counter for maintaining a count state for identifying those periods during which that terminal may transmit its various message signals. The terminal transmit slot counter is offset from the terminal receive slot counter by the number of bit periods which nominally compensates for signal propagation delay over path 25 (accounting for remote terminal location) and processing delay in terminal 30. As mentioned, the nominal delay for each remote terminal is accurate within four bit periods. Following the first four guard bit positions, each message begins with a five bit synchronization word. In each message signal, following the five bit synchronization word, 19 bits are reserved in the message formats for terminal addresses. 17 of these bits are used in the present embodiment to specify 131,072 unique address codes. The 18th bit is used to indicate whether a coded address is to be interpreted as an individual terminal address (when it is a binary 1) or a multiple terminal address (when it is a binary zero). The remaining bit position is used as a parity bit, and provides a measure of error detection. Therefore, for the presently described system, the addressing capacity includes 262,144 unique numbers of which 131,071 may be individual subscriber addresses.

In FIG. 1 it will be assumed that the data terminal 20 has the binary address which will be hereinafter referred to as T–1 and the data terminal 21 shown will be referred to by the binary address T–2. In the herein described example, it will be assumed that T–1 wishes to be connected to transmission path 25 so that an average access time of 0.32 seconds may be attained. It will further be assumed that T–1 wishes to transmit a data message to T–2 at a data rate equal to 150 bits/second.

In the present system, a 256 bit frame synchronization signal is repetitively transmitted in the first slot of every 1,024 slots in a frame period, starting with the first slot in a frame. The frame synchronization signal has the general format shown in FIG. *2a* in which the numerals below the baseline in that figure denote the number of bits in each segment or word of the signal. This notation is also used in conjunction with the remaining portions of FIG. 2. (It will be understood that all message formats include a 4 bit guard word, denoted G in FIG. 2, at the beginning and end of each of the 256 bit message signal, and further include a 5 bit synchronization word, denoted S, following the first 4 bit guard word. All bits in the message format which are unused in the presently described embodiment are denoted by the symbol B). The frame synchronization signal is transmitted on the outbound channel 26 from control terminal 30 and is received by all data terminals connected to path 25.

Also at 1,024 slot intervals during a frame period, control terminal 30 transmits request slot assignment signals (starting with the 513th slot in a frame). Over a multiple framed sequence, the duration of which depends on the number of data terminals connected to path 25, all terminals attached to signal path 25 will be addressed by a request slot assignment signal. As shown in FIG. 2b, the request slot assignment signal contains, in addition to the guard and synchronization words, a word corresponding to the address T–1 and two subsequent words. In the present exemplary embodiment, decimal numbers are shown to represent the first assigned slot and spacing for subsequent slots. It will be understood that in other embodiments, coded representations of the assigned slots may be used. In FIG. 2b these words are 1,200 and 2,048. In the request slot assignment signal of FIG. 2b, the T–1 word serves to identify that particular request slot assignment signal as being intended for receipt by terminal T–1, and will be identified as such by that terminal and subsequently selectively received by that terminal. The word corresponding to 1,200 is the first slot in a frame period during which terminal T–1 may transmit a sign-on request signal. The second word, 2,048, indicates that the spacing of subsequent slots assigned to terminal T–1 for sign-on request signals. That is, terminal T–1 may transmit sign-on request during any of four slots in a frame in the present system: slot number 1,200, 3,248, 5,296 or 7,344. Since there are four possible request slots during a frame, the average wait or mean access time for terminal T–1 will be ⅛ of a frame period or 0.32 seconds, which corresponds to the initial assumed constraint on the system.

Figure 2A:
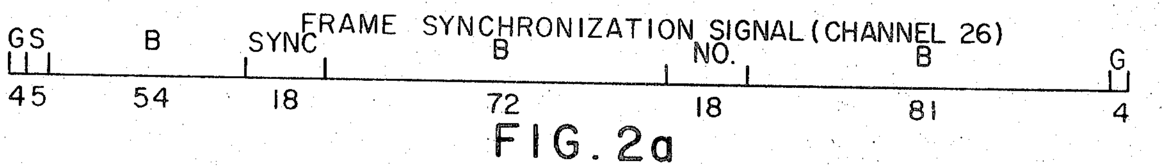
FIG. 2*a–h* show message signal formats for use with the system of FIG. 1.
Figure 2B:
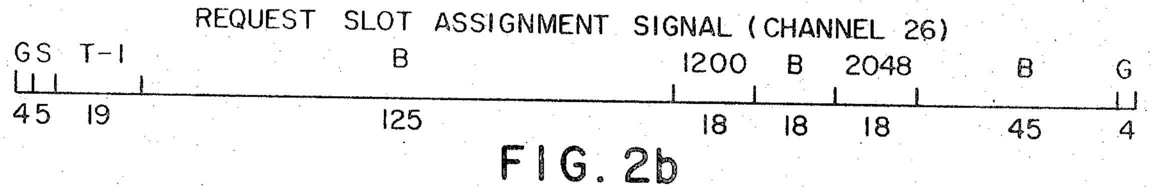
Figure 2C:
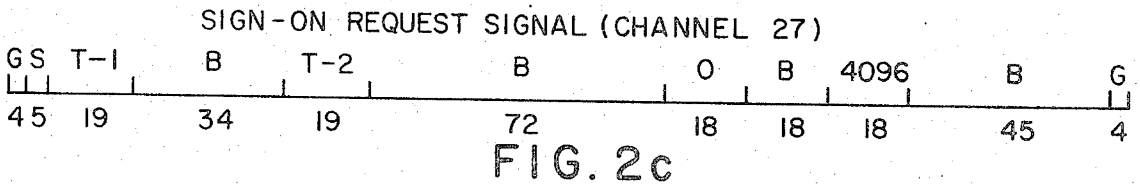

FIG. 2c shows a sign-on request signal which may be transmitted by terminal T–1 in a one of the above listed time slots, as assigned by control terminal 30. In that figure, a sequence of four binary words are transmitted by terminal T–1. The first, T–1, indicates the address of the requesting terminal. The second, T–2, indicates the address word corresponding to the intended receiver terminal, to which T–1 desires to be linked. The third word is a binary word equivalent to zero, and is not used in a sign-on request. The fourth word, 4,096 is indicative of a sign-on request and denotes the data slot spacing requested for the transmission of data signals during a frame. A spacing of 4,096, as in the present example, indicates that two slots per frame are being requested. As will be seen below, the data signal in the present system may be used to transmit 192 data bits per slot. At a two slot per frame rate, 384 data bits may thereby be transmitted per frame by terminal T–1, which translates to a data rate equal to 150 bits per second in a system having the present parameters, thereby meeting the initial assumed constraint for the exemplary link between terminals T–1 and T–2.

Figure 2D:
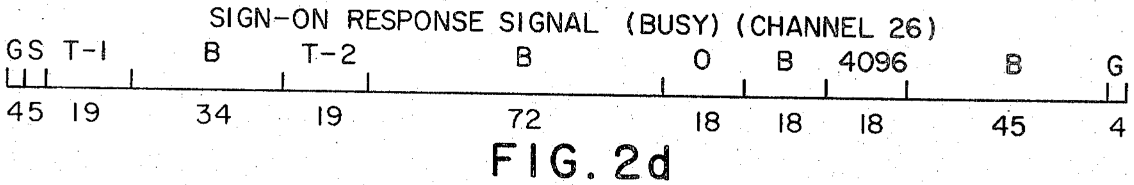
Figure 2E:
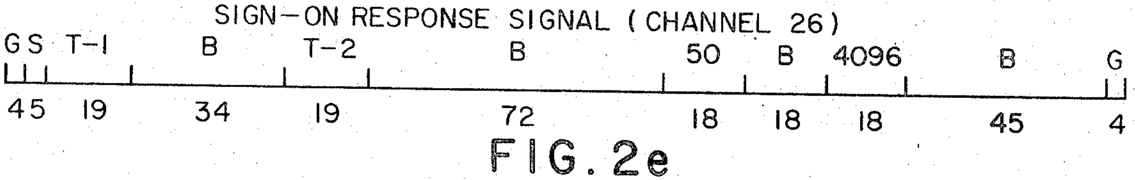

On receipt of the sign-on request signal as shown in FIG. 2c, central control terminal 30 is effective to search through an associated memory section to determine which time slots are associated with terminals presently linked and further to find a set of time slots (defined in terms of a first slot and spacing of subsequent slots in a frame) which corresponds to the requested data rate in the sign-on request signal from terminal T–1. If no such set of slots is available, then control terminal 30 transmits a signal as shown in FIG. 2d on outbound channel 26. This sign-on response signal is a "busy" signal as denoted by the binary zero word in the third word, described above, and the slot spacing word, 4,096, in the fourth word. Terminal T–1 selectively receives this signal, as addressed thereto, and must then retransmit a sign-on request signal to get a linkage with terminal T–2. It will be assumed in this example that terminals 30 determines that time slot 50 is available for use and further slot 4,146 (corresponding to a slot spacing of 4,096) are available and hereafter assigned to terminal 20 (T–1) for its transmission to terminal 21 (T–2). Control terminal 30 is then effective to transmit a sign-on response signal as shown in FIG. 2e, via outbound channel 27 in the same slot in which the sign-on request signal was transmitted from terminal 20 (T–1). That sign-on response signal comprises four binary words, the first being an address word corresponding to the address T–1, which serves to enable terminal 20 (T–1) to receive that signal. The second word, T–2, serves as an indication to terminal 20 (T–1) that the link is correctly identified to be with terminal 21 (T–2). The third word, 50, indicates the number of the first slot assigned for data transmission in each subsequent frame period, while the fourth word, 4,096, indicates the spacing of subsequent slots assigned within each frame for data transmission by terminal 20 (T–1). It will be understood that this corresponds, for the particular linkage from terminal 20 to terminal 21 (T–1 to T–2), to an assignment of data slots 50 and 4,146 in each frame until the termination of the linkage.

Figure 2F:
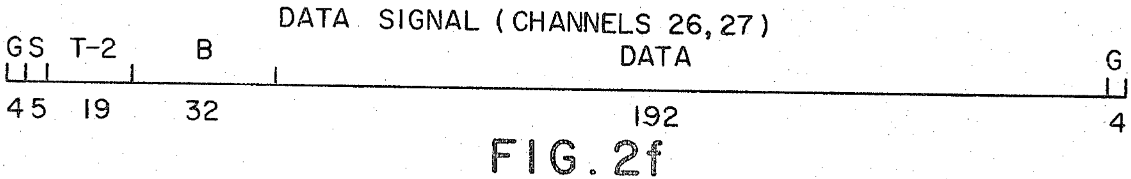

Upon receipt and identification of this sign-on response signal by terminal 20 (T–1), that terminal is effective during the next available slot number 50 or 4,146 to commence data transmission to terminal 21 (T–2) on the inbound channel 27 of path 25. As shown in FIG. 2f, that data signal includes a first binary word, T–2, so that the intended receiving terminal may identify the data signal as such. A second word in that signal is a 192 bit data word which represents a portion of the message to be transmitted from terminals 20 to 21 (T–1 to T–2). Terminal 20 (T–1) continues to transmit messages of the form of the data signal in FIG. 2f in each subsequent slot 50 and 4,146, i.e. at an effective data rate equal to 150 bits per second, until all desired data is transmitted. When the data signals as transmitted by terminal 20 (T–1) on inbound channel 27 are received by central control terminal 30, they are repeated on the outbound channel 26 in the order of receipt. The signals, as transmitted on outbound channel 26, are selectively identified and received by terminal 21 (T–2), upon identifying the address prefix T–2 of those signals. The 192 bit data word is thus transmitted from terminal 20 (T–1) to terminal 21 (T–2), thereby establishing 150 bit per second communication linkage between terminals 20 and 21 (T–1 and T–2).

Figure 2G:
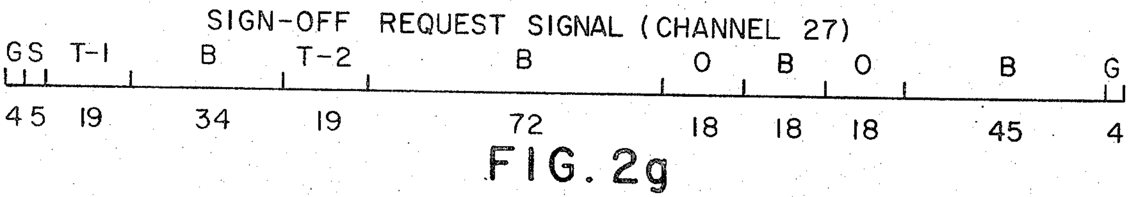
Figure 2H:
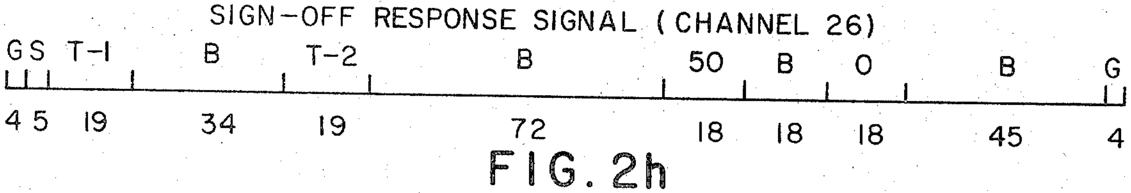

When terminal 20 (T–1) has completed its data transmission to terminal 21 (T–2), that terminal so indicates in a one of its assigned request slots by transmitting a sign-off request signal of the format shown in FIG. 2g. That signal includes four binary words, the first representing the address of the requesting terminal 20 (T–1) and the second representing the address of the receiving terminal in the linkage, terminal 21 (T–2). The third word is unused and the fourth word is binary zero. The words act as a control signal indicating that a sign-off, or termination of the linkage, is being requested by terminal 20 (T–1). The sign-off request signal is transmitted on inbound channel 27 to control terminal 30.

Upon receipt of the sign-off request signal by terminal 30, that terminal is effective to disassociate (in its internal memory) slots 50 and 4,146 as data slots assigned to terminal 20 (T–1) for its linkage between terminals 20 and 21 (T–1 and T–2). Terminal 30 is then effective to transmit on outbound line 26 a sign-off response signal in accordance with the format shown in FIG. 2h, wherein the first two words comprise the addresses of requesting terminal 20 (T–1) and intended receiver terminal 21 (T–2), respectively, and the third word represents a non-zero number with the fourth word being a binary zero. The third and fourth words are detected at terminal 20 (T–1) and serve to inform that terminal that its linkage is terminated.

In this above described cycle of operation, a first terminal 20 (T–1) has thus been effective to gain access to the signal path 25 within the 0.32 second average waiting time, or mean access time, required, and terminal 20 (T–1) has been effective to establish a 150 bit per second communication link between that terminal and terminal 21 (T–2).

The operation of the hereindescribed embodiment may be summarized as follows: a remote data terminal wishing to transmit information to another remote data terminal determines from request slot assignment signals (transmitted by a central control terminal 30 and addressed to that specific remote data terminal) the transmit slots which are assigned for service requests. That terminal then transmits a sign-on request signal in a one of its assigned request slots, receives a sign-on response signal in a one of its assigned request slots from control terminal 30 bearing the data slot assignment information. Data messages to be transmitted to the intended receiver terminal are inserted in the data slots thereby assigned. These data signals are repeated by the control center on the outbound channel from that control center. The repeated data signals are selectively received only by that remote terminal bearing the address of the intended receiver. The data is extracted from that received data signal and transferred to the remote terminals receiving equipment for subsequent processing. When a requesting terminal desires to terminate the data transmitting operation, a sign-off request signal is transmitted to terminal 30, and in response to a sign-off response signal is transmitted from terminal 30 to the initial service requesting terminal.

In the system having the above described parameters, wherein there are 8,192 slots in each system frame, and wherein each slot may contain 192 data bits in a data signal, assignment of one or more slots per frame to an individual data terminal for data transmission results in data service rates of $75 \times 2^n$ bits per second, where $n$ is an integer ranging from 0 to 12, representative of the number of assigned data slots per frame. In the above described example, since the terminal 20 (T–1) required a data rate equal to 150 bits per second, two slots were assigned for data transmission for the communication link between terminals 20 and 21 (T–1 and T–2).

The system of FIG. 1 can accomodate both synchronous and asynchronous subscriber data terminals. Synchronous terminals directly utilize one of the available $75 \times 2^n$ bits per second data service rates as described above. Synchronous subscribers that wish to establish links at other data rates may also use a one of the $75 \times 2^n$ system data service rates but use only a portion of the 192 bits per message. As a result, a general relationship to express all possible synchronous data rates, R can be written as $$R = b/192 \times 75 \times 2^n$$

where $b$ is an integer ranging from 1 to 192 and is proportional to the data service efficiency. Asynchronous subscribers can also be accommodated by the system shown in FIG. 1 by the use of an interface that is capable of translating the asynchronous subscriber data into synchronous data within the system at one of the standard system data service rates, $75 \times 2^n$.

It will be understood that in other embodiments, other parameters may be used and the hereindescribed invention is not limited to the particular system described above.

Figure 3A:
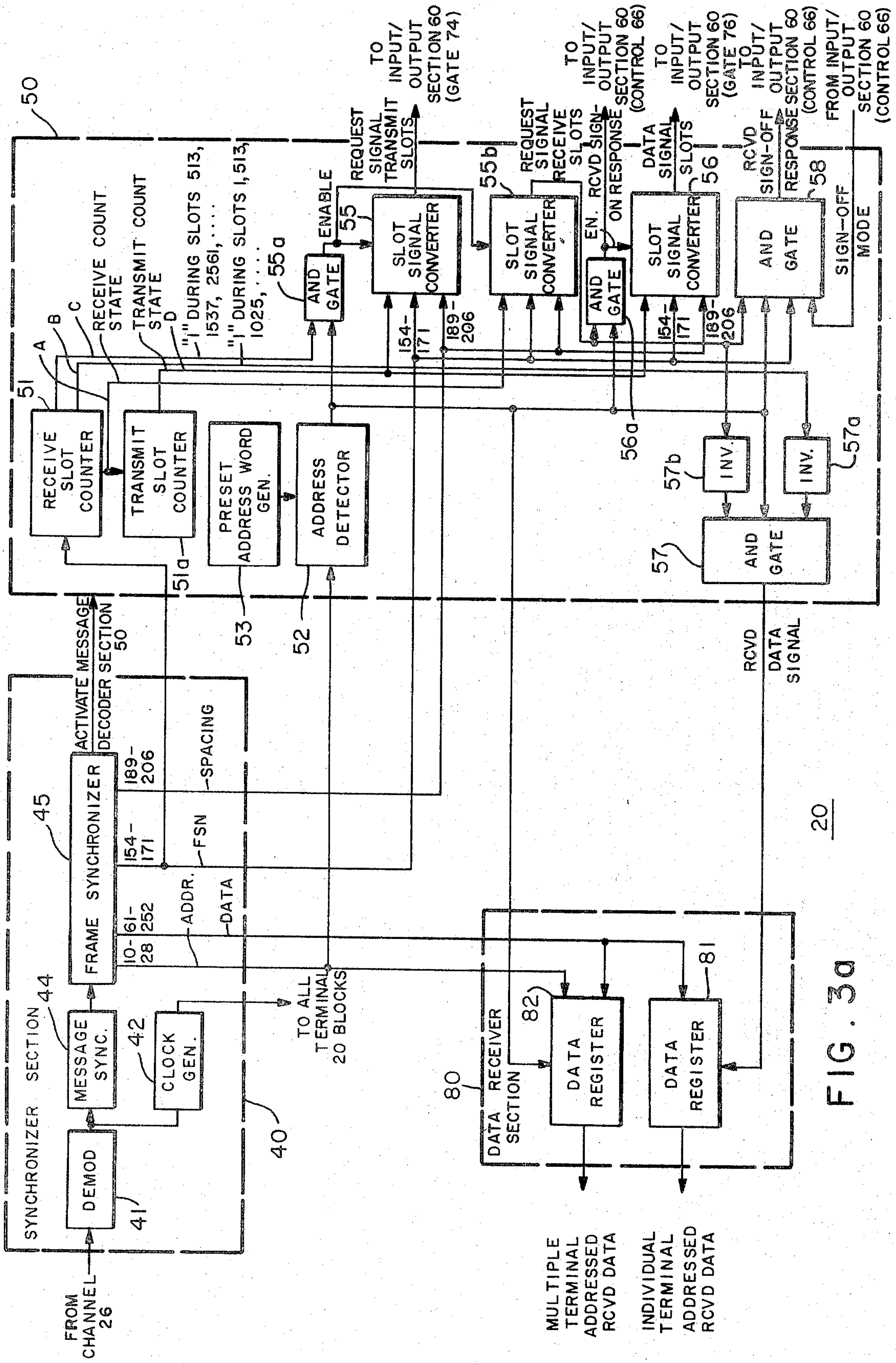
FIGS. 3*a–b* show in block diagram form an embodiment of a remote data terminal for use with the system of FIG. 1.

An embodiment of the invention having the above described characteristics will now be described in detailed form in conjunction with FIGS. 3 and 4. FIGS. 3a and b show, in block diagram form, an embodiment of a remote data terminal, such as terminal 20. Terminal 20 is shown to include a synchronizer section 40, a message decoder section 50, a input/output section 60 and a receiver section 80.

Synchronizer section 40 has an input connection from outbound channel 26 of signal path 25 which passes all signals on channel 26 to the demodulator 41. The output of demodulator 41 is applied to both the clock generator 42 and message synchronizer 44. Generator 42 is effective in operation to derive a clock signal from the demodulated signal. The clock signal is applied to all blocks within terminal 20. The output of message synchronizer 44 is applied to an input of frame synchronizer 45. A first output of frame synchronizer 45 indicates that the terminal 20 operation is synchronized with the various frame signals transmitted over path 25 and that first output is used to transfer a control signal to thereafter energize, or enable, the message decoder section 50 of terminal 20. A second output is used to update a receive slot counter in message decoder section 50 as described below. The various other bit position output lines of frame synchronizer 45 are applied to other portions of terminal 20, as described below.

In operation, the demodulated data signal as applied by demodulator 41 is continually shifted through message synchronizer 44 at the clock rate, corresponding to the clock signal produced by generator 42. As shown in FIG. 2, the format of all signals within the slots of the framed time sequence includes a five bit synchronizing word in the 5th through the 9th bit positions of each message signal. As the incoming data is shifted therethrough, message synchronizer 44 is effective to detect the five bit synchronization word applied to input lines to that synchronizer 44. Detection of the synchronization word is effective to establish a "tentative message synchronization state." The detection of the five bit synchronization word during each of four successive 256 bit data segments causes synchronizer 44 to establish a "message synchronization state," whereupon the subsequent bits of the applied message signal are transferred to the frame synchronizer 45. In other embodiments, other synchronization thresholds may be used.

One the "message synchronization state" is achieved, frame synchronizer 45 continually processes the incoming slot message signals until a frame synchronization signal having the format shown in FIG. 2a, is identified from the 18 bit word in the 61st through the 78th bit positions in the received message signal. Upon identification of a frame synchronization signal, synchronizer 45 first generates a control signal to activate the message decoder section 50 of terminal 20 and then applies the various subsequently applied data bits from each received message signal blocks of terminal 20 as shown in FIG. 3a by the signal flow arrows leaving from frame synchronizer 45, where the reference numerals associated with the arrows identify the bit positions of the data transferred thereby. The binary data in bit positions 154 through 171 in the received message signal are representative of the slot number of the correspondingly identified frame synchronization signal (it will be understood that there are eight such signals per frame occurring during slots which are multiple of 1,024). The slot number of the particular frame synchronization signal is used to update the receive slot counter in message decoder section 50.

The net result of the above described operation of synchronizer section 40 is to identify discrete 256 bit message signals within the various time slots, to route the various portions of those signals to the appropriate blocks of terminal 20, and to generate appropriate control signals to update the receive slot counter in section 50 of terminal 20.

Message decoder section 50 includes a thirteen bit binary receive slot counter 51 having an input connected to frame synchronizer 45 in synchronizer section 40. The count state output of counter 51 is connected to a transmit slot counter 51a via line A. The counter 51a is interconnected with counter 51 so that both counters increment together. The count state of counter 51a is offset from that of counter 51 by a number representative of the appropriate number of bit periods for terminal 20 to compensate for the signal propagation delay between remote terminal 20 and central control terminal 30, and also signal processing delay in terminals 20 and 30. Counter 51 has a first set of outputs, denoted A in FIG. 3a, representative of the state of counter 51. This set of output lines is applied to both transmit counter 51a and slot signal converter 55b. A second output of counter 51, denoted B in FIG. 3a, is connected via digital inverter 57a to AND gate 57. Counter 51 is effective to generate a binary one on output B during every 512th slot, and multiple thereof, during a frame, commencing with the first slot. This output line is binary zero at all other times. (Note that the output from frame synchronizer 45 is effective to activate message decoder section 50 following the synchronization operation of section 40). A third output of counter 51, denoted C in FIG. 3a, is connected via a first input AND gate 55a to the enabling input of slot signal converters 55 and 55b. Counter 51 is effective to apply a binary one to this line every 1,024 time slots, commencing with the 513th slot during a frame. This line is maintained at binary zero for all other times. These latter signals on line C from counter 51, are effective to identify those slots during which request slot assignment signals may be received from terminal control terminal 30 on outbound channel 26.

Section 50 further includes address detector 52 having an input upon which the data from bit positions 10–28 of the received message signals are applied by synchronizer 45. A second set of inputs to detector 52 is connected from address word generator 53, which generator provides an 18 bit parallel binary output signal corresponding to the unique address word associated with terminal 20. An output line from detector 52 is connected each of AND gates 55a, 56a, 57 and 58. The output line from detector 52 is further connected to data register 82 of data receiver section 80.

Also included in section 50 are slot signal converters 55, 55b, and 56, each having sets of inputs upon which the data from bit positions 154–171 and 189–206 of the received message signals are applied by synchronizer 45. Slot signal converter 55 provides on its output line, a signal coincident with those REQUEST time slots assigned to terminal 20 for transmitting request signals. Converter 55b provides a similar output signal coincident with those REQUEST time slots assigned for receiving request signals. To generate those output signals, converters 55 and 55b are activated by AND gate 55 following the receipt of an addressed message signal (as indicated by detector 52) during a one of slots 513, 1537, 2561 . . . (as indicated by receive counter 51, line C). Converter 55 compares the transmit count state (as indicated by counter 51a, line D) with the data from bit positions 154–171 of the received message signal from synchronizer 45 and identifies the first REQUEST transmit time slot matching the binary number provided by that data. Converter 55b operates similarly except that the receive count state, line A, is compared with the data from bit positions 154–171 to identify the first REQUEST receive time slot. Converters 55 and 55b then respectively identify as transmit and receive REQUEST slots those subsequent transmit and receive count states spaced from the first detected slot by the binary number provided by the data from bit positions 189–206 of the received message signal. The output signals comprise binary ones coincident with the bit periods corresponding to those detected time slots. The output of convertr 55b is applied to AND gates 56a and 58, and via inverter 57b, to AND gate 57. This output signal is also applied to input/output section 60.

In a similar manner, slot signal converter 56 generates on its output line, a signal coincident with the DATA time slots assigned to terminal 20 for transmission of data to a linked terminal. This output line is connected to input/output section 60. AND gate 58 has an additional set of inputs from synchronizer 45 to receive the data from the 189th through the 206th bit positions of the received message signal. Another input to gate 58 is applied from input/output section 60 to denote a sign-off request operation initiated in section 60. The output of gate 58 is applied to input/output section 60. The output of AND gate 57 is applied to data receiver section 80.

In operation, message decoder section 50 is energized by a signal from frame synchronizer 45 in section 40 upon the determination that the synchronizer section 40 is properly aligned in time with the received message signal. At that time address detector 52 is arranged to compare the terminal address portion of the received message signal, i.e. the bits in the 10th through the 28th bit positions, with the preset address word of the terminal 20 as stored in address word generator 53. Upon a determination that the address portion of the received message signal (i.e. the data in bit positions 10–28) is a multiple terminal address, detector 52 then applies an appropriate control signal to data register 82 of data receiver section 80, thereby enabling terminal 20 to receive the accompanying data in bit positions 10–28 and 61–252 of the received message signal.

Upon determination that the address is an individual terminal address and that the address matches that stored in generator 53, detector 52 applies an enabling input to each of AND gates 55*a*, 56*a*, 57 and 58.

Following receipt of a frame synchronization signal, i.e. during slot numbers 1, 1,025, . . . , receive slot counter 51 is updated to be in the proper time slot count state. In this operation, frame synchronizer 45 is effective to set counter 51 to that count state by applying the slot number as received in the 154th through 171st bit positions of the received data signal. Thus, receive slot counter 51 is updated eight times during a frame, following each of the frame synchronization signals (which are of the form as shown in FIG. 2*a*). It will be understood that counter 51 thereafter maintains a slot count which is incremented from the updated value by clock generator 42. As described above, transmit slot counter 51*a* provides a tracking slot count which is offset from receive slot counter 51 by the number of bit periods to compensate for propagation and signal processing delays.

During time slot 513 and all subsequent slots within a frame which are displayed by 1,024 slots and multiples thereof, i.e. 1,537, 2,561, 3,585 . . . , AND gate 55*a* is enabled by the output signal from counter 51 on line C so that during ones of those time slots, whenever a message signal as received by frame synchronizer 45 is determined by detector 52 to bear the appropriate terminal 20 address, gate 55*a* is effective to activate slot converters 55 and 55*b*. Those converters in turn process the data in bit positions 154–171 and 189–206 of the received message signal to determine from the request slot assignment signal (having the format shown in FIG. 2*b*) the assigned REQUEST signal slots for both receiving and transmitting by terminal 20. Converters 55 and 55*b*, as described above, are effective to transform the first slot number from bit positions 154–171 of the message signal and the subsequent slot spacing from bit positions 189–206 of the message signal to output signals which provide binary ones during the designated REQUEST time slots. The output signal from converter 55, thus provides control signals which are coincident with and mark those slots which are assigned to the terminal 20 for transmission of sign-on and sign-off request signals. As described below in conjunction with input/output section 60, those REQUEST time slots may be used by terminal 20 to generate and transmit sign-on and sign-off request signals over channel 27 to central control terminal 30. Similarly, the output from converter 55*b* provides control signals marking those slots during which terminal 20 may receive such signals.

The control signals marking the REQUEST receive slots (from converter 55*b*) are also applied to AND gate 56*a* to activate slot signal converter 56 during those REQUEST slots when detector 52 is effective to detect a message word addressed to terminal 20 from central control terminal 30. A sign-on response signal from terminal 30 is such a signal and includes two binary words denoting the first slot within a frame and subsequent slot spacing during which assigned slots terminal 20 may transmit data signals to an intended receiver terminal. The two words denoting the first slot and subsequent slot spacing in a sign-on response signal are derived from the data in bit positions 154–171 and 189–206 of the received message signal. Slot signal converter 56 operates in a manner similar to that of converters 55 and 55*b* to produce an output signal comprising control signals coincident with and marking those DATA slots during which the input/output section 60 may transmit data signals to an intended receiver terminal. In this manner, a sign-on response signal from terminal 30 is recognized by terminal 20 and the assigned DATA slots are determined.

Inverters 57*a* and *b*, with their applied input signals, operate to enable AND gate 57 during all slots excepting the first slot and those slots which are displaced by 512 and multiples thereof from the first slot (which slots are reserved for frame synchronization and request slot assignment signals) and the REQUEST slots assigned to terminal 20. Upon identification by detector 52 of a message signal addressed to terminal 20 in a one of these time slots, AND gate 57 generates an appropriate control signal indicating that a data word addressed to terminal 20 has been received. This control signal is applied to data receiver station 80. In this manner a signal addressed to terminal 20 from some other remote terminal will be recognized by terminal 20 as addressed to itself and an appropriate control signal generated to transfer the data word portion (in bit positions 61–252) of that message signal from frame synchronizer 45 to the operator of terminal 20.

AND gate 58 is effective to produce a sign-off control signal for input/output section 60 to denote the termination of a communication linkage. This output signal is produced by gate 58 following a sign-off request control signal as generated in input/output section 60 and following the receipt by synchronizer 45 of terminal 20 of a sign-off response signal from terminal 30 in a one of the assigned REQUEST slots of terminal 20. This response is identified as such by gate 58 from a word comprising binary 0's as applied by synchronizer 45 from bit positions 154–171 of the received message signal. On the receipt of such a signal, the control signal from gate 58 is effective to transfer the mode control portion of input/output section 60 to the receive only mode and from the sign-off mode, as described below.

Data receiver section 80 includes data register 81 for transferring from synchronizer 45 the 192 bit data portion (i.e. from the 61st through the 252nd bits) of an individual terminal addressed message signal to the operator of terminal 20. Register 82 provides for a multiple terminal addressed message signal a similar transfer to the operator of the 192 bit data portion and, in addition, the 19 bit address portion (i.e. from the 10th through the 28th bits). The load/shift inputs of registers 81 and 82 are connected to AND gate 57 and address detector 52, respectively, of message decoder section 50. In operation, when detector 52 determines that a message signal having an individual terminal address corresponding to the terminal 20 preset address has been received, an appropriate control signal is applied from gate 57, which signal is effective to load into data register 81 the 192 data bits (in bit positions 61–252 of the received message signal) as routed by synchronizer 45. The loaded data bits are then serially shifted out (at an appropriate clock rate) to the terminal 20 operator as received data. In the case where detector 52 determines that a message signal having a multiple terminal address has been received, an appropriate control signal is applied by detector 52 to register 82 to similarly load and transfer the data from bit positions 10–28 in addition to the data from 61–252 to the operator of terminal 20. It will be understood that, in other embodiments, each of registers 81 and 82 may be of a dual register form wherein each comprises a pair of registers for receiving and shifting out alternate data words (at the remote terminal clock rate) to the operator in alternate slot periods. In that manner, a higher overall speed of processing may be achieved.

Input/output section 60 (FIG. 3*b*) includes a 256 bit shift register 62 for storing message words prior to transmission from terminal 20 to central control terminal 30. (It will be understood that the eight guard bits in positions 1–4 and 253–256 as stored in register 62 are not transmitted by terminal 20 via cable 27 to terminal 30. As a result, terminal 30 may compensate for various small propagation delays attributable to remote terminal location by receiving message signals from channel 27 which may be displaced in time by as much as four bit periods. Coarse propagation delay compensation is provided by the offset of transmit counter 51*a* from receive counter 51, as described above.) A first AND gate 63 is connected to provide a 19 bit parallel input to bit positions 10–28. A first input to gate 63 is provided from OR gate 64. A second input to gate 63 is provided by a 19 line parallel input signal representing the terminal 20 address (such as may be entered automatically from generator 53). A second AND gate 65 also provides, when activated, a 19 bit input to bit positions 10–28 of register 62. Gate 65 similarly has a 19 bit parallel input which is representative of an intended receiver terminal address (as entered by an operator of terminal 20). Gate 65 is activated by an appropriate data mode control signal as applied to a second input via a control line (line E of FIG. 3*b*) from mode control 66. A third AND gate 67 is connected to provide a 19 bit parallel input to bit positions 63–81 of register 62. A 19 line parallel input, representative of the intended receiver terminal address (as entered by an operator) is connected to provide a first input to gate 67. A control line from gate 64 is applied to a second input at gate 67.

A fourth AND gate 69 provides a 192 line parallel connection to bit positions 61–252 of register 62. A 192 parallel line data input from interface 69*a* is connected to a first set of inputs of gate 69. Interface 69*a* may accomodate either a serial or parallel loading local terminal input device to transform a local terminal DATA input signal to a suitable form to be loaded into register 62. A second input is connected to gate 69, to apply a data mode control signal from mode control 66 (line E of FIG. 3*b*). A fifth AND gate 71 is connected to provide two sets of 18 bit inputs, respectively to bit positions 154–171 and 189–206 of register 62. A first input to gate 71 comprises 18 parallel lines as supplied from the operator of terminal 20. The data on these lines is representative of the requested data rate. A second input provides a reference level for a binary "zero." A third input applied a sign-on mode control signal by a connection to mode control 66 (line D of FIG. 3*b* ). When activated (to generate a portion of a sign-on request signal), gate 71 is effective to insert an 18 bit word composed of binary zeroes in bit positions 154–171 and an 18 bit word representative of the requested data rate (i.e., the number of slots required per frame) in bit positions 189–206. A sixth AND gate 73 is also connected to bit positions 154–171 and 189–206. A first input to gate 73 is also the reference level for binary "zero." A second input is provided by a connection to mode control 66 (line F of FIG. 3*b*), thereby applying a sign-off mode control signal.

Figure 3B:
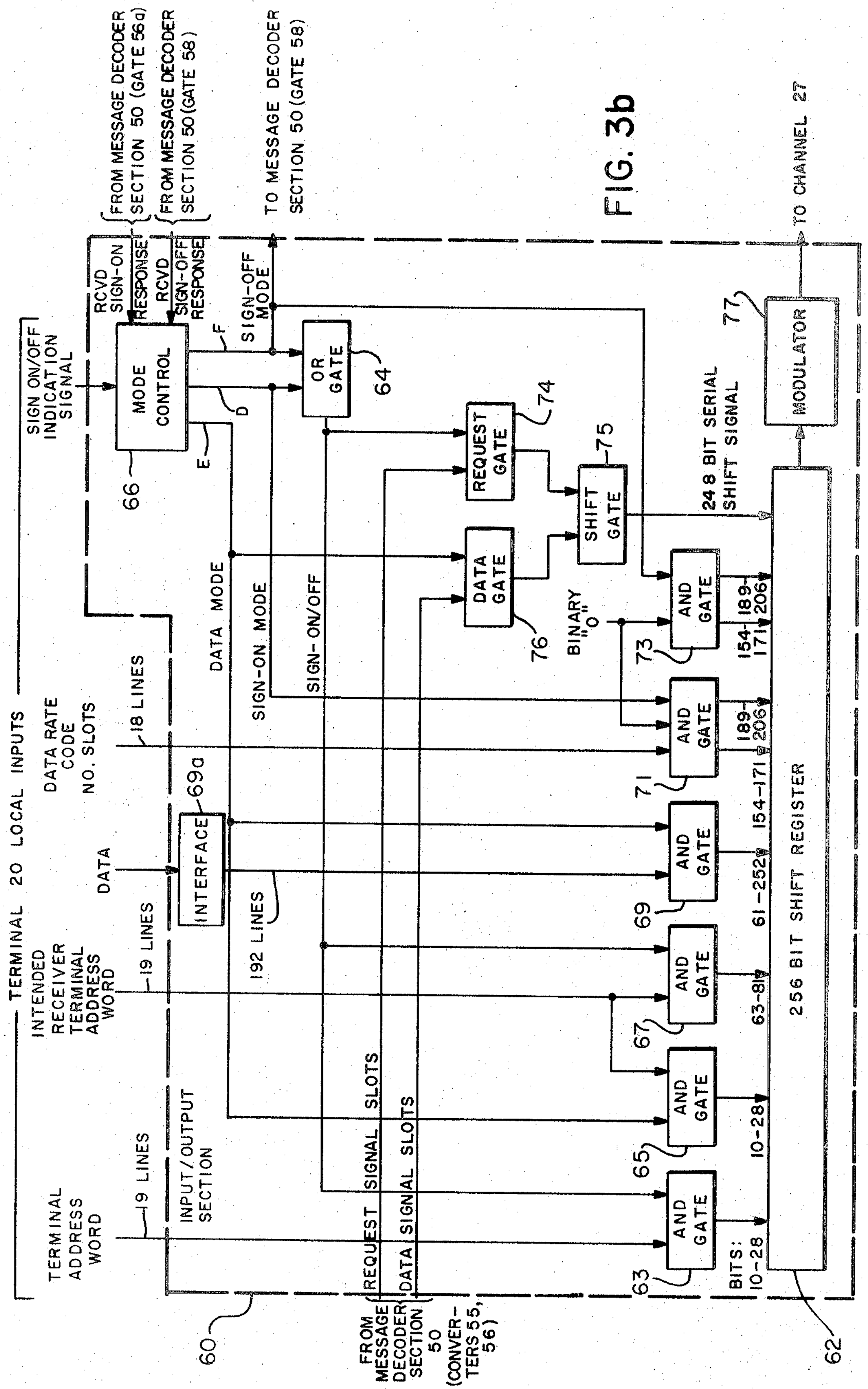

OR gate 64 is provided with two input connections from mode control 66 (lines D and F of FIG. 3*b*). An output of gate 64 is applied as a first input to request AND gate 74. A second input to request gate 74 is applied from slot signal converter 55 of message decoder section 50. The output of gate 74 is applied to shift (OR) gate 75. A first input to data (AND) gate 76 is supplied by mode control 66 and a second input by slot signal converter 56 of message decoder section 50. The output of data gate 76 is applied as a second input to shift gate 75, the output of which is supplied to the "serial shift-out" input terminal of register 62. The 248 bit sign-on request signal of register 62 (the eight guard bits are not included) is applied via modulator 77 to channel 27. Mode control 66 is provided with an input line which is controlled by the operator of terminal 20.

Mode control 66 controls the operation of input/output section 60. When in the "data receive only" mode, control 66 is effective to prevent all other blocks in section 60 from operating. In response to a sign-on request signal as provided by the operator of terminal 20, mode control 66 enters the "sign-on mode" and generates an appropriate control signal on the indicated line D of section 60. Coincident with a sign-on request signal applied to control 66 are appropriate signals applied to the indicated terminal 20 local inputs, i.e. a local terminal address, an intended receiver terminal address, a first slot number word and a data rate code. These signals are applied to the correspondingly indicated lines of FIG. 3*b*. Gates 64, 63, 67 and 71 are then effective to load a terminal 20 address word, an intended receiver address word, an all binary zero first slot number word and a data rate code word (representative of the number of desired slots for data transmission) in the respective bit locations 10–28, 63–81, 154–171 and 189–206 of register 62. Upon receipt of a sign-on request signal slot control signal from slot converter 55 of message decoder section 50, request gate 74 is effective to pass a control signal via shift gate 75 to register 62. This control signal is effective to initiate a serial shift out the 256 bit message stored in register 62 and apply that signal to modulator 77. Modulator 77 is effective to appropriately modulate and transmit that signal (having the format shown in FIG. 2*c*) over channel 27 to control terminal 30 during the next one of the sign-on request slots as assigned to terminal 20.

It will be understood that register 62 may comprise a pair of 256 bit shift registers wherein each of the two registers is used to store a 248 bit message signal and then to shift out the stored signal during alternate transmitting time slots. In this manner, a message signal may be serially loaded and composed for subsequent transmission while a previously composed signal is being shifted out at the same time. (In an embodiment where register 62 has such a dual register configuration, interface 69*a* is no longer required to provide serial to parallel conversion). Thereby transmission of message signals may be achieved in adjacent time slots.

Following receipt by terminal 30 of the thus generated sign-on request signal, terminal 30 generates a sign-on response signal (having the format shown in FIG. 2*d*) which is received by section 40 via channel 26 and decoded in section 50, with data signal slot control signals applied via the output line of converter 56 to data gate 76 of section 60. The control signal applied to the enabling input of converter 56 (from gate 56*a*) is also applied to mode control 66 to transfer control 66 to the "data mode." When in the data mode, control 66 provides a data mode control signal to the inputs of gates 65, 69 and 76 (via line E). These signals are effective to load an intended receiver terminal address word and a 192 bit data word to the bit location 10–28 and 61–252, respectively. In this manner, a first data word is stored in register 62 for transmission via terminal 30 to the intended receiver terminal. The next data signal slot control signal as applied from converter 56 to data gate 76 is effective via gate 75 to shift out the 248 bit data signal (having the format shown in FIG. 2F except that the 8 guard bits are not included) from register 62 and apply that signal to modulator 77. Again, the signal applied to modulator 77 is suitably modulated and then transmitted over channel 27 to terminal 30. This operation is repetitively performed for successively applied data words to the input of gate 69 for each subsequent data signal slot control signal as applied to data gate 76.

It will be noted for this embodiment that the terminal 20, once having been assigned slots for data transmission, can thereafter communicate with a third terminal by merely substituting that terminal's address in bit positions 10–28 of the data signal which is generated by terminal 20. The data signal addressed to the third terminal is relayed by central control terminal 30 to the outbound channel 26 whereupon the signal is identified and processed by the addressed terminal. It will be further noted that an alternative embodiment may be configured so that a remote terminal which has received a message signal in a time slot may transmit a message signal back to the original transmitting terminal in that same set of time slot without having to obtain its own DATA slots from control terminal 30. In this manner a "half duplex" system may be implemented.

When the operator of terminal 20 determines that the access to the communication path 25 is to be terminated, a sign-off indication signal is applied to mode control 66 by the operator. Control 66 is then effective to apply a control signal (via line F) by a gate 64 to gates 63, 67 and 74. The signal is also applied to gate 73 and to AND gate 58 in message decoder section 50. This signal is effective to load into register 62, a terminal 20 address word, an intended terminal address word, and a pair of words comprising binary zeroes in bit locations 10–28, 63–81, 154–171, and 189–206, respectively. The next control signal from converter 55 in section 50 is effective to transfer out the 248 bit sign-off request signal as stored in register 62 via modulator 77 to terminal 30 (having the format shown in FIG. 2*g* except that the 8 guard bits are not included). When terminal 30 responds with a sign-off response signal (having the format shown in FIG. 2*h*), which is recognized by AND gate 58 of section 50, a control signal is applied from gate 58 to mode control 66 returning that control to the "data receive only" mode.

The above described embodiment of terminal 20 is only representative of and not a limitation on the form of terminal which is operative in accordance with the present invention. In other embodiments, other forms may be used. The electronic circuitry configurations represented by the functional blocks in the figures may be of any suitable form known in the art. The specific forms are not considered to be a part of this invention.

Figure 4:
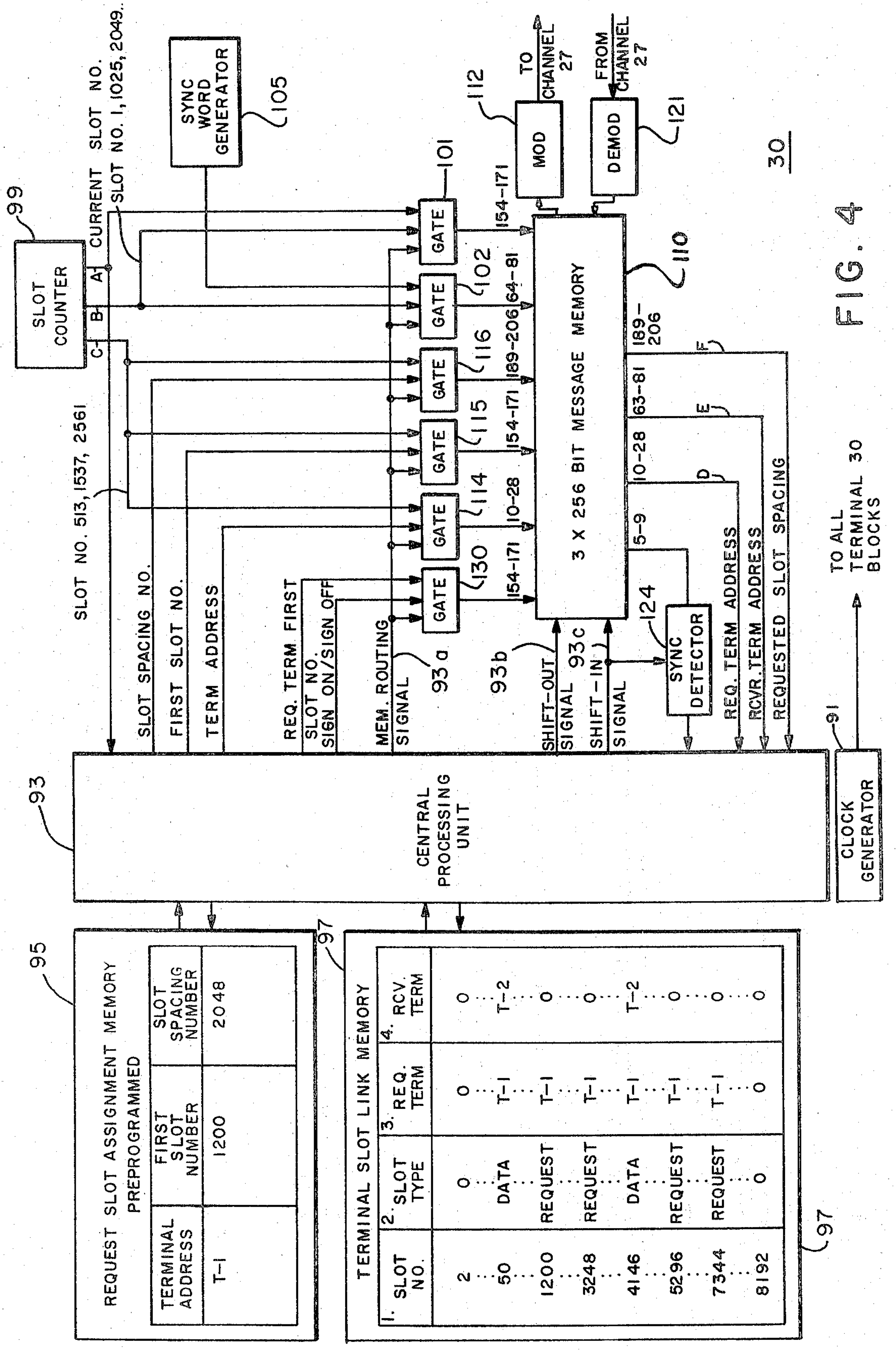
FIG. 4 shows in block diagram form an embodiment of a central control terminal for use with the system of FIG. 1.

FIG. 4 shows, in block diagram form, an embodiment of a central control terminal such as terminal 30. As may be seen from that figure, terminal 30 includes a clock generator 91 for providing a clock signal to all other blocks in terminal 30. Terminal 30 also includes a central processing unit (CPU) 93 which is interconnected to a request slot assignment memory 95 and a terminal link slot memory 97. Memory 95 may be of any form known in the art suitable to store a list of 18 bit terminal address words, and associate with each word a first binary word representative of a slot number and a second binary word representative of a slot spacing number. Memory 95 is preprogrammed to associate one or more stored terminal address words with pairs of binary words for establishing a corresponding number of time slots in a frame to be used by the terminal having the associated address for gaining access to the signal path 25.

Terminal link slot memory 97 may have a first form as shown in FIG. 4 wherein a record is maintained for each of the slots in a frame (excepting those used for frame synchronization and request slot assignment signals, i.e. 1, 513, 1,025, 1,537, . . .). Each record may have associated therewith a binary word indicative of the assignment of the corresponding time slot as a DATA or REQUEST slot (column 2 of memory 97 in FIG. 4) and of the requesting terminal and intended receiving terminal (columns 3 and 4 of memory 97 in FIG. 4) of a link.

Figure 5:
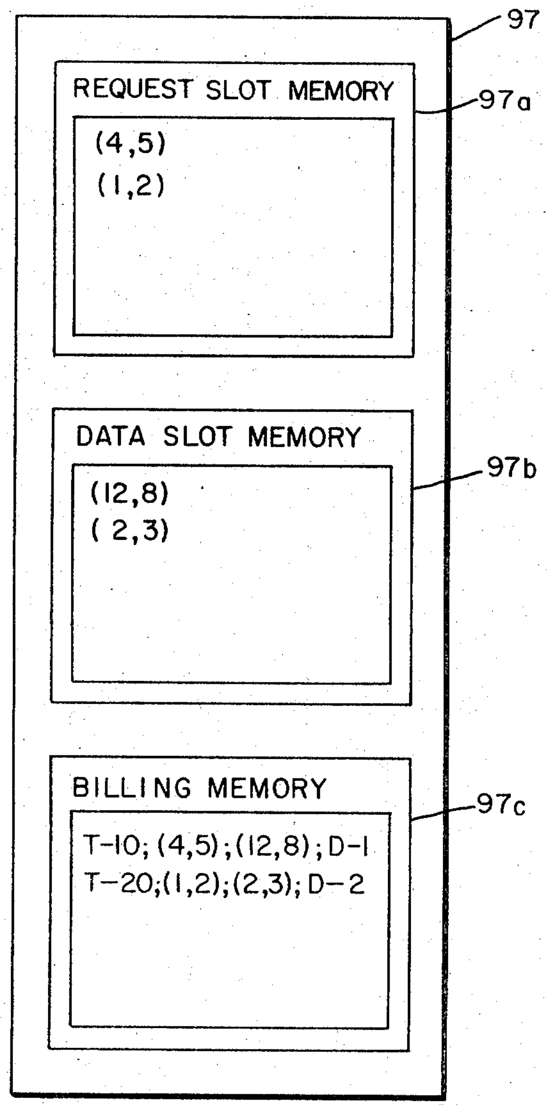
FIG. 5 shows in block diagram form an embodiment of a memory for use with the terminal of FIG. 4.

In an alternative form, memory 97 may have a second form as shown in FIG. 5 wherein the same information as the form of FIG. 4 is maintained in an encoded form in a plurality of memory sections. The immediately following description pertains to an embodiment of the present invention using the memory 97 having the form shown in FIG. 4. An embodiment of the latter alternative form is described below in conjunction with FIG. 5.

In operation, central processing unit 93 is effective to sequentially withdraw from memory 95 a terminal address (or set of terminal addresses) and the associated two binary words during successive ones of the slots designated for generating request slot assignment signals on channel 26 (i.e. during slot numbers 513, 1537, 2561, and all other slots in a frame displaced by 1,024 slots and multiples of thereof). FIG. 4 shows a first address word, T–1 and an associated pair of binary words (in decimal form), 1200 and 2048, in the list of memory 95. This data corresponds to that used for the above described example (see discussion relevant to FIG. 2). In other embodiments, such data may be stored in encoded binary form. The address word, T–1, and associated pair 1,200 and 2,048, indicate that, in the above example, the terminal with address T–1 is assigned the request slots starting with 1,200 and every slot thereafter which is displaced by 2,048 and multiples thereof, i.e., 1200, 3248, 5296, and 7344.

Terminal link slot memory 97, as shown in FIG. 4, may be of any suitable form known in the art in which a list of 8,192 thirteen bit slot numbers may be stored therein together with three associated words. These words are indicated in memory 97 of FIG. 4 as follows: the first word which may be associated with a slot number is a code word denoting whether the associated slot is being used for a REQUEST slot for the addressed terminal (REQUEST) or as a DATA slot for that terminal (DATA); the second word which may be associated with a slot number is an address word corresponding to a request terminal (e.g., T–1 in FIG. 4); and the third word (which is non-zero in DATA slots only) is an address word corresponding to the intended receiver terminal (e.g., T–2 in FIG. 4).

FIG. 4 shows the contents of memory 97 for the slots required in the above described example in which terminal T–1 establishes a communications link with terminal T–2. It will be understood in this example that T–1 is assigned request slots beginning with slot 1200 and every slot which is a multiple of 2,048 thereafter, in accordance with the request slot assignment signal as shown in FIG. 2*b*. It will further be understood that terminal T–1 is also shown in FIG. 4 to be assigned slot 50 and all slots which are a multiple of 4,096 thereafter for data transmission in accordance with sign-on response signal of FIG. 2*e*. Those slots which are multiples of 512, commencing with slot number 1, are not listed in memory 97 since those slots may only be used by terminal 30 for frame synchronization signals and request slot assignment signals. All unassigned slots are provided with binary 0 words, e.g., slots 2 and 8192 as shown in FIG. 4.

Central control terminal 30 further includes a 13 bit slot counter 99, the output state of which is representative of the current time slot of terminal 30. A first output of counter 99, line A of FIG. 4, is a parallel 13 bit output connection to CPU 93 and to AND gate 101, for providing a signal representative of the count state of counter 99. A second output of slot counter 99, line B of FIG. 4, provides a binary 1 signal coincident with all time slots which are multiples of 1024 during a frame, commencing with the first slot. This output line is binary 0 at all other times. The time slots thus identified by the binary 1 are used for transmission of frame synchronization signals, having a format shown in FIG. 2*a*. Line B is connected to the second input of AND gate 101 and to a first input of AND gate 102. Sync word generator 105 applies a parallel 18 bit synchronization word to a second set of inputs to AND gate 102.

A memory 110 is provided which includes three 256 bit storage areas. Each of the three areas may be used in a first (or shift-in) mode to receive and store a message signal from inbound channel 27 (via demodulator 121), then in a second (or process mode) to permit modification of the received signal (under control of CPU 93), and finally in a third (or shift-out) mode to shift out and transmit the resultant message signal on outbound channel 26 (via modulator 112). CPU 93 controls the flow of input signals to memory 110 so that each of the three storage areas is used in the above mode sequence in a staggered manner. In this way, during a single time slot, the first 256 bit area may be used to receive a message signal, while the second area allows modification and the third area shifts out a previously modified signal. During the next time slot, each area performs the next step in the mode sequence, and similarly does so for each successive time slot. A control signal applied from CPU 93 via line 93*a* provides routing control of the data inputs to the various ones of the storage areas of memory 110. Control signals applied from CPU 93 via lines 93*b* and 93*c* respectively are effective to shift out a message signal for transmission (on channel 26) from the appropriate area of memory 110 and to shift in a received message signal (from channel 27) to the appropriate area of memory 110.

The output of gate 101 is a parallel 18 bit connection to bit positions 154–171 of each of the three 256 bit storage area of memory 110. The output of gate 102 similarly provides a parallel 18 bit connection to the bit locations 64–81 of the storage areas of memory 110. The particular area of memory 110 to which the signal from the gates is applied is controlled by CPU 93. (The notation in FIG. 4 for memory 110 is similar to that in FIG. 3. That is, the reference numerals adjacent to the inbound and outbound signal flow arrows are representative of the bit locations connected thereto. It will also be understood that bit locations 1–4 and 253–256 in the areas of memory 110 are maintained in all modes to have binary zeroes, thereby providing the guard bits in a message word. Further, bit positions 5–9 in each area of that memory which is in the process (or shift-out mode) are maintained to have a five bit synchronization word.)

In operation, CPU 93 (via line 93*a*) and slot counter 99 are effective to load a first area of memory 110 (in the process mode) with a frame synchronization signal, having the format of FIG. 2*a*, during time slots 1024, 2048, and other slots in a frame displaced by multiples of 1024. That first area of memory 110 is selected by CPU 93 (via line 93*a*) and is loaded with a frame synchronization word from the input signals applied by gate 102 and the current slot number from gate 101. During the next time slots (i.e. slot numbers 1025, 2049, . . . and also slot 1), the 256 bit word stored in the first area of memory 110 is transferred (in the shift-out mode) under the control of CPU 93 (via shift-out line 93*b*) to modulator 112 and outbound channel 26 to the remote terminals connected signal path 25.

Slot counter 99 also provides a third output, line C of FIG. 4, which output produces a binary 1 coincident with every 1,024th time slot commencing with slot number 512, i.e., 512, 1536, 2560, . . . . These time slots are used to compose a request slot assignment signal in a one of the areas of memory 110 (in the process mode) for transmission to various remote terminals connected to path 25 during the next subsequent time slot (i.e. 513, 1537, 2561, . . . ) in response to a control signal on line 93*b*. Line C is connected to a first input of AND gates 114, 115, and 116. A second set of inputs to gate 114 is provided by a 19 line parallel input from CPU 93. This input set provides a terminal address denoting the intended remote receiver terminal for a request slot assignment signal. A second input to gate 115 is similarly provided by an 18 line input from CPU 93 representative of a first slot number during which time the addressed terminal may request a terminal linkage.

Similarly, an 18 line input is provided to AND gate 116 from CPU 93, representative of spacing of subsequent slots during a frame which are also assigned to the remote terminal for requesting linkage. It will be understood that line 93*a* provides an appropriate routing signal (for selecting an area of memory 110) to each of gates 101, 102, 114, 115, and 116.

Gate 114 provides a 19 bit parallel input to bit positions 10–28 of memory 110. Similarly, gates 115, and 116 provide 18 bit parallel inputs to bit positions 154–171 and 189–206, respectively, of memory 110.

In operation, during the appropriate time slot, i.e. 512, 1536, 2560 . . . , CPU 93 withdraws from request slot assignment memory 95 a sequence of numbers representing a terminal address, a first slot number, and a slot spacing number. This sequence of numbers is then loaded into the appropriate bit locations in the current process mode area of memory 110 to thereby form a request slot assignment signal having the format shown in FIG. 2*b*. For the exemplary system discussed above, and shown in FIG. 2*b*, the three words withdrawn from memory 95 are shown in FIG. 4 to be T–1, 1200, and 2,048. During the next time slot following the storage of a 256 bit request slot assignment signal in memory 110, i.e. in a one of slots 513, 1537, 2561 . . . , that signal is transferred (in response to a control signal on line 93*a*) via modulator 112 and outbound channel 26 to all remote data terminals connected to path 25. As discussed above in conjunction with the decription of terminal 20, only the addressed terminal, i.e. T–1 in this case, is effective to process the signal as received to determine the assigned request time slots.

Following the transfer by CPU 93 of the request slot assignment signal, CPU 93 is effective to store in memory 97 a REQUEST code word and the terminal address associated with the assigned slot numbers. FIG. 4 shows for the example discussed above and in conjunction with FIG. 2, that slot numbers 1200, 3248, 5296, and 7344 are so loaded with a REQUEST code word, denoted REQUEST, and the terminal address, T–1.

Terminal 30 further includes a connection from inbound channel 27 to the demodulator 121. The output of the demodulator 121 is connected to the message memory 110. An incoming message signal from channel 27 is routed by CPU 93 (via line 93*c*) to the appropriate one of the three storage areas of memory 110 which is currently in the shift-in mode.

It will be understood that the message signals transferred by remote terminals over channel 27 comprise 248 bits since there are no guard bits transmitted with those signals, as described above. As a result, the imprecision of the determination by the remote data terminals of the proper time slot for transmission (due to propagation delays, and the like) may be compensated for by the operation of terminal 30. Terminal 30 is so effective to detect the time when bit positions 5–9 (of the current shift-in mode area of memory 110 receiving the incoming message signal) are loaded with the 5 bit synchronization word, allowing for as much as a 4 bit time displacement of that signal. Sync detector 124 is activated to monitor bit positions 5–9 of the shift-in mode area of memory 110 in response to the shift-in control signal on line 93*c*. Detector 124 then applies a control signal to CPU 93 upon the detection of that synchronization word in the shift-in mode storage area of memory 110, denoting that a full message signal is stored in memory 110.

During the next time slot following detection of a full received message signal, the contents of bit positions 10–28, 63–81, and 154–171 are applied to CPU 93 for processing.

In operation during this time slot, CPU 93 is effective first to determine the current slot number as applied from slot counter 99 and then to determine from the terminal link slot memory 97 the type of message signal which the message signal stored in current process mode area of memory 110 represents, that is, whether the signal is a DATA or a REQUEST signal.

In operation, during a REQUEST slot as determined by CPU 93 from memory 97, the address data on lines D and E of FIG. 4 respectively represent the requesting terminal address and the intended receiver terminal address.

A binary zero signal in bit position 189–206, as applied to line F, denotes to CPU 93 that the message signal in the process mode area of memory 110 is a sign-off request. For a sign-on request, CPU 93 processes that message signal in memory 110 by determining the requested slot spacing (i.e., the data rate requested by terminal T–1) as stored in bit positions 189–206, of that signal in memory 110 and applied to unit 93 via line F. CPU 93 then determines the number of a first slot which is followed by unassigned slots at the requested spacing, all of which slots are currently unused. CPU 93 then stores, in the locations of memory 97 associated with the selected slots an encoded word (DATA in FIG. 4) representing a DATA slot. In other embodiments, the requesting and intended receiver terminal addresses may also be stored. The latter step of storing the intended terminal address (column 4 of memory 97 in FIG. 4) is not required to provide the requesting terminal with access to signal path 25, but may be used to provide billing information for the various terminals.

In FIG. 4, the above described example is shown wherein the code word DATA and addresses T–1 and T–2 are stored in the locations associated with slot numbers 50 and 4146. The CPU 93 thereupon transfers a binary word representative of the first slot number to a first input of gate 130. CPU 93 then transfers a request control signal and a routing control signal (via line 93*a*) to respective inputs of gate 130. Gate 130 includes an 18 line output connected to the bit positions 154–171 of memory 110. The control signals applied by unit 93 to gate 130 is effective to modify the stored signal in the process mode area of memory 110 with a sign-on response signal having the form shown in FIG. 2*e*, that is, a signal representative of the first assigned slot is loaded into bit positions 154–171 via gate 130. The assigned subsequent slot spacing word (bit positions 189–206) is maintained as received from the remote terminal. The sign-on response signal as thus stored in memory 110 is transferred during the next time slot (with the storage area of memory 110 being in the shift-out mode) via modulator 112 and outbound channel 26 to all remote terminals connected to path 25. It will be understood that in the example described above only the addressed terminal, T–1, will be effective to selectively receive and process the data in that message signal.

In the case where CPU 93 determines that the signal stored in the process mode area of memory 110 is a sign-on request signal, but where CPU 93 further determines from memory 97 that there are no available sets of time slots which will permit the assignment of a sufficient number of time slots to achieve the requested rate, then CPU 93 does not modify the message signal as stored in the current process mode area of memory 110 (see FIG. 2*d*). During the next time slot when that storage area enters the shift-out mode, the entire received sign-on request signal as received from terminal T–1 is thereupon transferred by a modulator 112 and outbound channel 26. That signal (which is identical to the sign-on request signal) is then applied to the terminals connected to path 25, whereupon it is selectively received by terminal T–1 and identified as a "busy" response signal. This operation indicates to terminal T–1 that no satisfactory set of time slots is presently available at terminal 30 and that an access to signal path 25 cannot be effectuated at the present time.

For message signals received by memory 110 during a DATA slot, as determined by CPU 93 from memory 97, CPU 93 does not modify that received signal during the process mode for the corresponding storage area of memory 110. The effect of determining that a DATA signal has been received is to directly transfer the received data signal during the next time slot via modulator 112 and channel 26 to the terminals connected to path 25. The signal is then selectively received by the addressed terminal.

In the case where a signal is received by memory 110 from channel 27 during a REQUEST slot, as determined by CPU 93 from memory 97, CPU 93 determines from the data in bit positions 189–206 of the process mode area of memory 110 whether the signal is a sign-off request (when the words in bit positions 189–206 as applied by line F of FIG. 4 are all binary zeroes.) CPU 93 is then effective to modify the signal in the process mode area of memory 110 to be a sign-off response signal having the format of FIG. 2*h*. During the shift-out mode (in the next time slot), that signal is then transferred via modulator 112 and outbound channel 26 to the remote terminals connected to path 25. CPU 93 is then effective to store binary zeroes at all slot locations in memory 97 which were formerly used to denote DATA slots associated with the requesting terminal. In the above example, slots 50 and 4146 are so loaded with binary zeroes. In this manner the requesting terminal (T–1 in the above example) relinquishes its communication link to signal path 25.

FIG. 5 shows an alternative form of memory 97 for use in the above described embodiment of the present invention wherein that alternative form replaces memory 97 as shown in FIG. 4. In the embodiment having memory 97 in the form of FIG. 5, time slots within a frame are also assigned by CPU 93 for use as a REQUEST and DATA slots as in an embodiment having memory 97 in the form of FIG. 4, but the assigned slots are not associated in the memory sections 97*a* and *b* with the particular requesting remote terminals. That is, merely a list of assigned slots is maintained. Further, the set of slots thereby assigned is selected by CPU 93 in accordance with a technique which permits encoding of the information for recording the time slot assignments and greatly facilitates the required signal processing by CPU 93 for the identification of the various assigned slots. More particularly, the sets of time slots which may be assigned are described in terms of families with each family having an associated system data rate. For example, in the above system having 8,192 time slots, the Table 1 shows thirteen families (each being identified by a family number *m* (column 1)), the number of assigned slots per frame (column 2), the associated data rates (column 3), slot spacing (column 4), and the number of sets of slots per family (column 5).

TABLE 1

| 1. Family Number (*m*) | 2. Slots Per Frame Per Set | 3. Data Rate (BPS) | 4. Spacing Between Slots in a Set | 5. Number of Sets of Slots per Family |
|---|---|---|---|---|
| 1 | 4096 | 307,200 | 2 | 2 |
| 2 | 2048 | 153,600 | 4 | 4 |
| 3 | 1024 | 76,800 | 8 | 8 |
| 4 | 512 | 38,400 | 16 | 16 |
| 5 | 256 | 19,200 | 32 | 32 |
| 6 | 128 | 9,600 | 64 | 64 |
| 7 | 64 | 4,800 | 128 | 128 |
| 8 | 32 | 2,400 | 256 | 256 |
| 9 | 16 | 1,200 | 512 | 512 |
| 10 | 8 | 600 | 1024 | 1024 |
| 11 | 4 | 300 | 2048 | 2048 |
| 12 | 2 | 150 | 4096 | 4096 |
| 13 | 1 | 75 | 8192 | 8192 |

Note that each family includes two or more independent sets of slots which may provide the associated data rate. For example, for the family *m* = 1, there are 2 sets of slots (column 5) having spacing 2 (column 4), i.e., slot numbers 1, 3, 5, . . . 8191 and slot numbers 2, 4, 6, . . . , 8192. The other families (*m* = 2through 13) may be expressed similarly. A single set of slots may be expressed in terms of the family number, *m*, and a slot number within the desired set. Hereinbelow, the latter number is taken arbitrarily to be the first slot number in the set and referred to as "*fsn*". In other embodiments, other slot numbers in a set may be used. Thus, an (*m, fsn*) number pair uniquely defines a set of slots. For example, (10, 1) defines the Frame Synchronization slots as described above, i.e. slot numbers 1, 1025, 2049, . . . , and (10, 512) defines the Request Slot Assignment Signal slots, i.e., slot numbers 513, 1537, 3761, . . . . Thus using the (*m, fsn*) notation in binary form, only 17 bits are required to define any set of slots: four bits to specify *m* (which may be a number from 1 to 13), and 13 bits to specify *fsn* (the first slot number in the set). In the present embodiment, the totality of slots in a frame may be represented by the 13 bit binary numbers 0000000000000 through 1111111111111, corresponding to slot numbers 1 through 8192.

In the case where $m = 2$, it will be understood from Table 1 that there are 4 sets of slots thereby specified, each having 2,048 slots per frame and having spacing of 4. These four sets include slot numbers 1, 5, 9, . . . , slot numbers, 2, 6, 10, . . . , slot numbers 3, 7, 11, . . . and slot numbers, 4, 8, 12 . . . . The *fsn* number uniquely specifies a one of these sets of slots where $m = 2$ by indicating a first slot in the set. For example, if $m = 0010$ (or 2) and $fsn = 0000000000001$ (or 2), then the second of the above four sets of slots is thereby uniquely specified. It will be understood that the binary representations of all slots within a set have the same *m* least significant bits.

In the embodiment of the present invention using memory 97 in the form of FIG. 5, an assigned family of slots is specified by a number pair (*m, fsn*). CPU 93 is effective to compare the state of counter 99 with its record of assigned slot (which are stored in the (*m, fsn*) format). CPU 93 determines from the family number, *m*, the number of low order bits (starting from the least significant) of the slot number output of counter 99 which must be monitored to identify the family of slots. For example, if *m* equals 1, CPU 93 looks only at the least significant bit of the slot counter output. CPU then determines the first *m* (or 1, in this case) least significant bits of the associated 13 bit *fsn* word for use in the identification of the assigned slots in the frame. CPU 93 identifies these slots by comparing the first *m* least significant bits of the slot counter 99 output and identifies, as assigned slots, those slots which have the corresponding matching bits. In this manner, CPU 93 is effective to identify from memroy 97 a family of time slots through the pair of numbers (*m, fsn*), which relate to the slot spacing and first slot number in a frame.

In the present embodiment, as shown in FIG. 5, memory 97 comprises a REQUEST slot memory 97*a* and a DATA slot memory 97*b*. In the respective memories 97*a* and *b*, CPU 93 records in the (*m, fsn*) format the families of REQUEST and DATA slots as they are assigned to the various remote terminals. As a result of this manner of assigning and storing assigned slots, the CPU 93 signal processing is much more readily accomplished than in the format of memory 97 as shown in FIG. 4. In addition, the required memory storage capacity is reduce.

FIG. 5 further shows a portion of memory 97 to include billing memory 97*c*. This memory maintains the information equivalent to that shown in columns 3 and 4 in the memory 97 of FIG. 4. This information is primarily maintained to provide a record of the usage of signal path 25 by the various terminals for billing purposes. As with columns 3 and 4 of the memory shown in FIG. 4, this memory 97*c* is an optional portion and is not required to be present in all embodiments of the present invention.

In FIG. 5, request slot memory 97*a* is shown to have stored two exemplary (*m, fsn*) number pairs: it will be understood that the numbers shown as stored in memory 97 in FIG. 5 and as described below are in decimal form for clarity, whereas in a practical embodiment of the invention those numbers would be stored in binary form. In memory 97*a* the pair (4, 5) denotes (in accordance with Table 1) that slot numbers 5, 21, 37, . . . are assigned as REQUEST slots. Similarly, the pair (1, 2) indicates that slot numbers 2, 4, 6, 8, . . . are also assigned as REQUEST slots. In memory 97*b* the stored number pairs (12, 8) and (2, 3) indicate respectively that slots 8 and 4117 and slots 3, 7, 11, . . . are assigned as DATA slots (yielding data rates 150 and 153,600 bits per second respectively).

Billing memory 97*c* is shown to include the information that terminal T–10 has been assigned the request slots specified by (4, 5) and the DATA slots specified by (12, 8). In addition, terminal T–20 is shown to have been assigned the request slots specified by (1, 2) and the DATA slots specified by (2, 3). In addition, memory 97*c* shows code words D–1 and D–2 associated respectively with terminal T–10 and T–20, these code words being respresentative of the number of time slots which have been assigned for use by the various remote terminals. This information, reflecting the proportional usage may be generated by CPU 93 in some embodiments and then transferred to memory 97 where that data may be used for billing purposes. In such and other embodiments, each remote terminal may further provide with its sign-on request signal a binary control signal representative of the desired duration of the requested linkage from which CPU 93 may more efficiently assign families of slots responsive to the requested data rates.

The various remote terminals may operate in either half or full duplex mode following assignment of DATA slots to a first remote terminal by CPU 93. That is, in the half duplex mode, a first remote terminal can transmit message signals to a second remote terminal during all assigned DATA slots. In the half duplex mode, a first remote terminal may transmit data signals to a second terminal during some portion of the assigned DATA slots (whenever that terminal desires to transmit), while another terminal may transmit return data signals to the first terminal during any of the remaining DATA slots. Using this latter mode, a single terminal may successively interrogate in succession a plurality of other remote terminals to accomplish a task such as utility meter reading.

The presently described embodiment may further provide a polling function for allowing a terminal to successively interrogate remote terminals in the half duplex mode to determine the operational status of the various terminals. The polling function is accomplished by including binary word control signals in the request slot assignment signals to identify slot numbers of subsequently generated polling signals. The remote terminals use the polling slot numbers to identify a polling signal, having a format substantially similar to the data signal in FIG. 2*e*, and to transmit in response thereto a suitable response signal in the next identified polling slot, thereby identifying the status of the addressed remote terminal.

An additional operation, the monitor function, may also be accomplished with the present invention for system fault isolation and message signal flow control within a grid of remote terminals. The monitor function is used in conjunction with suitable remote data terminals. As a part of the frame synchronization signal (having the format similar to FIG. 2*a*) binary word control signals are added to provide a monitor terminal address and the first slot number and subsequent spacing of MONITOR slots during a frame. The various monitor remote terminals are addressed during successive frame synchronization slots and those monitor terminals selectively receive the monitor slot data. The monitor terminals then selectively receive and respond in the half duplex mode to the monitor signals (having substantially the same format as the data signal shown in FIG. 2e) during the respective assigned MONITOR slots. The various monitor terminals provide response actions to the monitor signals to identify system faults and provide compensating signal flow routing.

Much of the above description has specified the logical function to be performed. The implementation of the function can be carried out with a conventional logic arrangement, AND gates OR gates or NAND, NOR logic. It will be understood that the particular form of the various electronic circuits are not considered to be a part of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than the meaning and range of equivalency of the claims are therefore intended to be embraced therein.

What is claimed is:

1. A time division multiple access digital communications system for providing a communication link over a common signal path between at least two remote terminals, said system having a plurality of multiple bit digital message signals, each of said signals being disposed in a one of a plurality of time slots in a repetitive framed time sequence, comprising:

a. a common signal path, b. a plurality of remote subscriber terminals connected c. to said common signal path, and d. a central control terminal connected to said path having means for allocating predetermined numbers of time slots to selected ones of said remote terminals during each of said framed sequences, said predetermined number of slots being for transmission of digital sign-on request signals by the respective ones of said selected terminals to direct said central control terminal to link the requesting remote terminal to said signal path, said predetermined number of slots for providing said control terminal to be responsive to said sign-on request signals of the respective ones of said selected terminals during a predetermined proportion of each of said framed sequences, whereby said allocation of said predetermined number of time slots provides the respective ones of said remote terminals with a predetermined mean time for access to said signal path.

2. A time division multiple access digital communications system as described in claim 1 wherein each of said remote terminals includes:

a service request means for transmitting a digital sign-on request signal on said path to request a communication link, said link having a requested data rate, and wherein said central control terminal includes:

means for receiving from requesting remote terminals said transmitted sign-on request signals and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate, whereby the information capacity of said signal path is allocated to the respective ones of said requesting remote terminals in accordance with the various sign-on request signals.

3. A time division multiple access digital communication system as described in claim 2 wherein each of said remote terminals includes:

a sign-off request means for transmitting a digital sign-off request signal on said path to request the termination of said established communication link, and wherein said central control terminal includes:

means for receiving from requesting remote terminals said transmitted sign-off request signals and for disassociating said selected number of time slots previously allocated to the respective ones of said requesting terminals to terminate said communication link between ones of said requesting terminals and other terminals connected to said path, whereby the previously allocated portions of the information capacity of said signal path is available to be reallOcated to the respective one of said requesting remote terminals in accordance with the various sign-on request signals.

4. A time division multiple access digital communications system as defined in claim 3 wherein said central control terminal includes:

means for identifying a subset of time slots from a set having $2^n$ sequentially numbered time slots in a repetitive framed time sequence; where $n$ is an integer, said subset of slots being uniquely defined by a reference slot number, *fsn*, which is representative of a numbered member of said subset in said framed sequence, and a slot spacing number, $m$, where $m$ is an integer less than or equal to $n$ and is representative of the spacing between members of said subset in said framed sequence, said spacing being equal to $2^m$ slots, said identifying means comprising a. means for generating a binary coded digital *fsn* signal representative of said reference slot number, *fsn*.

b. a reference means for identifying the various ones of said set of $2n$ sequentially numbered time slots in said repetitive framed time sequence, and for generating a sequential binary coded reference signal associated with each of the successively identified time slots, c. means for comparing the $m$ least significant bits of said successively generated reference signals with the $m$ least significant bits of said digital *fsn* signal representative of said reference slot number, *fsn*, d. means for generating a control signal when said $m$ least significant bits of said compared signals exactly match, and for generating no such control signal otherwise, said control signal being coincident with and identifying the members of said subset of time slots.

5. A time division multiple access digital communications system as defined in claim 4 wherein said common signal path includes at least one pair of communication channels, the first channel of said pair for transmission of digital signals directed away from said control terminal, and the second of said pair for transmission of digital signals directed toward said control terminal, wherein each of said remote subscriber terminals has an associated binary address word for identification, and wherein said central control terminal further includes:

a. means for generating and transmitting a digital frame synchronization signal on said first channel in predetermined ones of said time slots, said signal having a binary code word for synchronizing the operation of said remote terminals,
b. means for generating and transmitting a digital request slot assignment signal on said first channel in predetermined ones of said time slots, said signal comprising a one of said remote terminal address words and at least one word for assigning to said addressed terminal a set of time slots in a frame to be request slots, said word for defining a first time slot and spacing for a plurality of subsequent time slots in a frame, said request slots being assigned to the correspondingly addressed remote terminal for the transmission of digital sign-on request signals,
c. means for receiving a digital sign-on request signal on said second channel from a requesting remote terminal in a one of said associated assigned request slots, said sign-on request signal comprising said requesting remote terminal address word, an intended receiver remote terminal address word and a data rate request word, said sign-on request signal for requesting said control terminal to link said requesting remote terminal via said signal path with a data rate corresponding to said rate request word,
d. means for generating and transmitting a digital sign-on response signal on said first channel in a one of said request slots for assigning a set of data slots to said requesting terminal for data transmission, said sign-on response signal comprising said requesting terminal address word, said intended receiver terminal address word and at least one word for identifying a set of data slots, said word for defining a first data slot and spacing for a plurality of subsequent data slots in a frame assigned to said first remote terminal for data transmission, the number of data slots in said set corresponding to the number defined by said data rate request word,
e. means for receiving digital data signals on said second channel in ones of said data slots assigned to the respective ones of said remote terminals, said data signals comprising a remote terminal address word and a data word, and
f. means for transmitting said received digital data signals on said first channel in ones of said data slots assigned to the respective ones of said remote terminals, said data signals comprising a remote terminal address word and a data word,
g. means for receiving a digital sign-off request signal on said second channel from a requesting remote terminal in a one of said associated assigned request slots, said sign-off request signal comprising said requesting remote terminal address word, an intended receiver remote terminal address word, and a sign-off indicator word, said sign-off request signal for requesting said control terminal to disassociate said requesting remote terminal from said signal path,
h. means for generating and transmitting a digital sign-off response signal on said first channel in a one of said request slots for indicating to said requesting terminal that the previously established communication link is terminated, said sign-off response comprising said requesting terminal address word, said intended receiver terminal address word and said sign-off indicator word.

6. A time division multiple access digital communications system as defined in claim 5 wherein each of said remote subscriber terminals includes:

a. means for receiving said digital frame synchronization signals on said first channel in a one of said time slots,
b. means for identifying and selectively receiving the respective ones of said digital request slot assignment signals on said first channel, said selectively received signals having the terminal address word associated with said receiving terminal,
c. means for generating and transmitting a one of said digital sign-on request signals on said second channel in a one of said assigned request slots for the respective ones of said terminals,
d. means for identifying and selectively receiving the respective ones of said digital sign-on response signals in ones of said time slots on said first channel, said selectively received signals having the terminal address word associated with said receiving terminal,
e. means for generating and transmitting said digital data signals on said second channel in a one of said assigned data slots for the respective ones of said terminals, and
f. means for identifying and selectively receiving the respective ones of said digital data signals in said time slots on said first channel, said selectively received signals having the terminal address word associated with said receiving terminal.
g. means for generating and transmitting said digital sign-off request signal on said second channel in a one of said assigned request slots for the respective ones of said terminals, and
h. means for identifying and selectively receiving the respective ones of said digital sign-off response signals on said first channel, said selectively received signals having the terminal address word associated with said receiving terminal.

7. A time division multiple access digital communications system as defined in claim 3 wherein said common signal path includes at least one pair of communication channels, the first channel of said pair for transmission of digital signals directed away from said control terminal, and the second of said pair for transmission of digital signals directed toward said control terminal, wherein each of said remote subscriber terminals has an associated binary address word for identification, and wherein said central control terminal further includes:

a. means for generating and transmitting a digital frame synchronization signal on said first channel in predetermined ones of said time slots, said signal having a binary code word for synchronizing the operation of said remote terminals,
b. means for generating and transmitting a digital request slot assignment signal on said first channel in predetermined ones of said time slots, said signal comprising a one of said remote terminal address words and at least one word for assigning to said addressed terminal a set of time slots in a frame to be request slots, said word for defining a first time slot and spacing for a plurality of subsequent time slots in a frame, said request slots being assinged to the correspondingly addressed remote terminal for the transmission of digital sign-on request signals, c. means for receiving a digital sign-on request signal on said second channel from a requesting remote terminal in a one of said associated assigned request slots, said sign-on request signal comprising said requesting remote terminal address word, an intended receiver remote terminal address word and a data rate request word, said sign-on request signal for requesting said control terminal to link said requesting remote terminal via said signal path with a data rate corresponding to said rate request word, d. means for generating and transmitting a digital sign-on response signal on said first channel in a one of said request slots for assigning a set of data slots to said requesting terminal for data transmission, said sign-on response signal comprising said requesting terminal address word, said intended receiver terminal address word and at least one word for identifying a set of data slots, said word for defining a first data slot and spacing for a plurality of subsequent data slots in a frame assigned to said first remote terminal for data transmission, the number of data slots in said set corresponding to the number defined by said data rate request word, e. means for receiving digital data signals on said second channel in ones of said data slots assigned to the respective ones of said remote terminals, said data signals comprising a remote terminal address word and a data word, and f. means for transmitting said received digital data signals on said first channel in ones of said data slots assigned to the respective ones of said remote terminals, said data signals comprising a remote terminal address word and a data word.

g. means for receiving a digital sign-off request signal on said second channel from a requesting remote terminal in a one of said associated assigned request slots, said sign-off request signal comprising said requesting remote terminal address word, an intended receiver remote terminal address word, and a sign-off indicator word, said sign-off request signal for requesting said control terminal to disassociate said requesting remote terminal from said signal path, h. means for generating and transmitting a digital sign-off response signal on said first channel in a one of said request slots for indicating to said requesting terminal that the previously established communication link is terminated, said sign-off response comprising said requesting terminal address word, said intended receiver terminal address word and said sign-off indicator word.

8. A time division multiple access digital communications system as defined in claim 7 wherein each of said remote subscriber terminals includes:

a. means for receiving said digital frame synchronization signals on said first channel in a one of said time slots, b. means for identifying and selectively receiving the respective ones of said digital request slot assignment signals on said first channel, said selectively received signals having the terminal address word associated with said receiving terminal, c. means for generating and transmitting a one of said digital sign-on reuest signals on said second channel in a one of said assigned request slots for the respective ones of said terminals, d. means for identifying and selectively receiving the respective ones of said digital sign-on response signals in ones of said time slots on said first channel, said selectively received signals having the terminal address word associated with said receiving terminal, e. means for generating and transmitting said digital data signals on said second channel in a one of said assigned data slots for the respective ones of said terminals, and f. means for identifying and selectively receiving the respective ones of said digital data signals in said time slots on said first channel, said selectively received signals having the terminal address word associated with said receiving terminal.

g. means for generating and transmitting said digital sign-off request signal on said second channel in a one of said assigned request slots for the respective ones of said terminals, and h. means for identifying and selectively receiving the respective ones of said digital sign-off response signals on said first channel, said selectively received signals having the terminal address word associated with said receiving terminal.

9. A time division multiple access digital communications system for providing a communication link over a common signal path between two or more of remote terminals, said system having a plurality of multiple bit digital message signals, each of said signals being disposed in a one of a plurality of time slots in a repetitive framed time sequence, comprising:

a. a common signal path, b. a plurality of remote subscriber terminals connected to said common signal path, c. a service request means in each of said remote terminals for transmitting a digital sign-on request signal on said path to request a communication link, said link having a requested data rate, and a central control terminal connected to said path for receiving from requesting terminals said transmitted sign-on request signals, and for allocating to the respective ones of said requesting terminals a selected number of time slots during each of said framed sequences to form a communication link between the ones of said requesting terminals and other terminals connected to said path, said selected number of slots for the respective ones of said requesting remote terminals being determined in response to said requested data rate, whereby the information capacity of said signal path is allocated to the respective ones of said requesting remote terminals in accordance with the various sign-on request signals.

10. A time division multiple access digital communication system as described in claim 9 wherein each of said remote terminals includes:

a sign-off means for transmitting a digital sign-off request signal on said path to request the termination of said established communication link, and wherein said central control terminal includes:

means for receiving from requesting remote terminals said transmitted sign-off request signals and for disassociating said selected number of time slots previously allocated to the respective ones of said requesting terminals to terminate said communication link between ones of said requesting terminals and other terminals connected to said path, whereby the previously allocated portions of the information capacity of said signal path is available to be reallocated to the respective one of said requesting remote terminals in accordance with the various sign-on request signals.

11. A time division multiple access digital communications system as defined in claim 10 wherein said central control terminal includes:

means for identifying a subset of time slots from a set having $2^n$ sequentially numbered time slots in a repetitive framed time sequence, where $n$ is an integer, said subset of slots being uniquely defined by a reference slot number, *fsn*, which is representative of a numbered member of said subset in said framed sequence, and a slot spacing number, $m$, where $m$ is an integer less than or equal to $n$ and is representative of the spacing between members of said subset in said framed sequence, said spacing being equal to $2^m$ slots, said identifying means comprising:

a. means for generating a binary coded digital *fsn* signal representative of said reference slot number, *fsn*, b. a reference means for identifying the various ones of said set of $2^n$ sequentially numbered time slots in a repetitive framed time sequence, and for generating said sequential binary coded reference signal associated with each of the successively identified time slots, c. for comparing the $m$ least significant bits of said successively generated reference signals with the $m$ least significant bits of said digital *fsn* signal representative of said reference slot number, *fsn*, d. means for generating a control signal when said $m$ least significant bits of said compared signals exactly match, and for generating no such control signal otherwise, said control signal being coincident with and identifying the members of said subset of time slots.

12. A time division multiple access digital communications system as defined in claim 11 wherein said common signal path includes at least one pair communication channels, the first channel of said pair for transmission of digital signals directed away from said control terminal, and the second of said pair for transmission of digital signals directed toward said control terminal, wherein each of said remote subscriber terminals has an associated binary address word for identification, and wherein said central control terminal further includes:

a. means for generating and transmitting a digital frame synchronization signal on said first channel in predetermined ones of said time slots, said signal having a binary code word for synchronizing the operation of said remote terminals, b. means for generating and transmitting a digital request slot assignment signal on said first channel in predetermined ones of said time slots, said signal comprising a one of said remote terminal address words and at least one word for assigning to said addressed terminal a set of time slots in a frame to be request slots, said word for defining a first time slot and spacing for a plurality subsequent time slots in a frame, said request slot being assigned to the correspondingly addressed remote terminal for the transmission of digital sign-on request signals, c. means for receiving a digital sign-on request signal on said second channel from a requesting remote terminal in a one of said associated assigned request slots, said sign-on request signal comprising said requesting remote terminal address word, an intended receiver remote terminal address word and a data rate request word, said sign-on request signal for requesting said control terminal to link said requesting remote terminal via said signal path with a data rate corresponding to said rate request word, d. means for generating and transmitting a digital sign-on response signal on said first channel in a one of said request slots for assigning a set of data slots to said requesting terminal for data transmission said sign-on response signal comprising said requesting terminal address word, said intended receiver terminal address word and at least one word for identifying a set of data slots, said word for defining a first data slot and spacing for a pluraity of subsequent data slots in a frame assigned to said first remote terminal for data transmission, the number of data slots in said set corresponding to the number defined by said data rate request word, e. means for receiving digital data signals on said second channel in ones of said data slots assigned to the respective ones of said remote terminals, said data signals comprising a remote terminal address word and a data word, and f. means for transmitting said received digital data signals on said first channel in ones of said data slots assigned to the respective ones of said remote terminals, said data signals comprising a remote terminal address word and a data word;

g. means for receiving a digital sign-off request signal on said second channel from a requesting remote terminal in a one of said associated assigned request slots, said sign-off request signal comprising said requesting remote terminal address word, an intended receiver remote terminal address word, and a sign-off indicator word, said sign-off request signal for requesting said control terminal to disassociate said requesting remote terminal from said signal path, h. means for generating and transmitting a digital sign-off response signal on said first channel in a one of said request slots for indicating to said requesting terminal that the previously established communication link is terminated, said sign-off response comprising said requesting terminal address word, said intended receiver terminal address word and said sign-off indicator word.

13. A time division multiple access digital communications system as defined in claim 12 wherein each of said remote subscriber terminals includes:

a. means for receiving said digital frame synchronization signals on said first channel in a one of said time slots, b. means for identifying and selectively receiving the respective ones of said digital request slot assignment signals on said first channel, said selectively received signals having the terminal address word associated with said receiving terminal, c. means for generating and transmitting a one of said digital sign-on request signals on said second channel in a one of said assigned request slots for the respective ones of said terminals, d. means for identifying and selectively receiving the respective ones of said digital sign-on response signals in ones of said time slots on said first channel, said selectively received signals having the terminal address word associated with said receiving terminal, e. means for generating and transmitting said digital data signals on said second channel in a one of said assigned data slots for the respective ones of said terminals, and f. means for identifying and selectively receiving the respective ones of said digital data signals in said time slots on said first channel, said selectively received signals having the terminal address word associated with said receiving terminal.

g. means for generating and transmitting said digital sign-off request signal on said second channel in a one of said assigned request slots for the respective ones of said terminals, and h. means for identifying and selectively receiving the respective ones of said digital sign-off response signals on said first channel, said selectively received signals having the terminal address word associated with said receiving terminal.

14. An apparatus for identifying a subset of time slots from a set having $2^n$ sequentially numbered time slots in a repetitive framed time sequence, where $n$ is an integer, said subset of slots being uniquely defined by a reference slot number, *fsn*, which is representative of a numbered member of said subset in said framed sequence, and a slot spacing number, $m$, where $m$ is an integer less than or equal to $n$ and is representative of the spacing between subsequent members of said subset in said framed sequence, said spacing being equal to $2^m$ slots, said apparatus comprising:

a. means for generating a binary coded digital *fsn* signal representative of said reference slot number, *fsn*, b. a reference means for identifying the various ones of said set of $2^n$ sequentially numbered time slots in said repetitive framed time sequence, and for generating a sequential binary coded reference signal associated with each of the successively identified time slots, c. means for comparing the $m$ least significant bits of said successively generated reference signals with the $m$ least significant bits of said digital *fsn* signal representative of said reference slot number, *fsn*, d. means for generating a control signal when said $m$ least significant bits of said compared signals exactly match, and for generating no such control signal otherwise, said control signal being coincident with and identifying the members of said subset of time slots.

15. A time division multiple access digital communications system for providing a communication link over a common signal path between at least two remote terminals, said system having a plurality of multiple bit digital message signals, each of said signals being disposed in a one of a plurality of time slots in a repetitive framed time sequence, said system comprising:

a. a central control terminal, for receiving digital signals from said remote terminals and for transmitting digital signals to said remote terminals, b. a wideband signal path connected to said control terminal, said signal path including at least one pair of communication channels, the first channel of said pair for transmission of digital signals directed away from said control terminal, and the second of said pair for transmission of digital signals directed toward said control terminal, c. a plurality of remote subscriber terminals, each of said remote terminals having a signal input connected to the first of said pair of channels for receiving digital signals from said control terminal, and a signal output connected to the second of said pair for transmitting digital signals to said control terminal, and each of said remote terminals having an associated binary address word for identification, wherein said central control terminal includes:

a. means for generating and transmitting a digital frame synchronization signal on said first channel in predetermined ones of said time slots, said signal having a binary code word for synchronizing the operation of said remote terminals, b. means for generating and transmitting a digital request slot assignment signal on said first channel in predetermined ones of said time slots, said signal comprising a one of said remote terminal address words and at least one word for assigning to said addressed terminal a set of time slots in a frame to be request slots, said word for defining a first time slot and spacing for a plurality subsequent time slots in a frame, said request slots being assigned to the correspondingly addressed remote terminal for the transmission of digital sign-on request signals, c. means for receiving a digital sign-on request signal on said second channel from a requesting remote terminal in a one of said associated assigned request slots, said sign-on request signal comprising said requesting remote terminal address word, an intended receiver remote terminal address word and a data rate request word, said sign-on request signal for requesting said control terminal to link said request remote terminal via said signal path with a data rate corresponding to said rate request word, d. means for generating and transmitting a digital sign-on response signal on said first channel in a one of said request slots for assigning a set of data slots to said requesting terminal for data transmission, said sign-on response signal comprising said requesting terminal address word, said intended receiver terminal address word and at least one word for identifying a set of data slots, said word for defining a first data slot and spacing for a plurality of subsequent data slots in a frame assigned to said first remote terminal for data transmission, the number of data slots in said set corresponding to the number defined by said data rate request word, e. means for receiving digital data signals on said second channel in ones of said data slots assigned to the respective ones of said remote terminals, said data signals comprising a remote terminal address word and a data word, and f. means for transmitting said received digital data signals on said first channel in ones of said data slots assigned to the respective ones of said remote terminals, said data signals comprising a remote terminal address word and a data word, g. means for receiving a digital sign-off request signal on said second channel from a requesting remote terminal in a one of said associated assigned request slots, said sign-off request signal comprising said requesting remote terminal address word, an intended receiver remote terminal address word, and a sign-off indicator word, said sign-off request signal for requesting said control terminal to disassociate said requesting remote terminal from said signal path, h. means for generating and transmitting a digital sign-off response signal on said first channel in as one of said request slots for indicating to said requesting terminal that the previously established communication link is terminated, said sign-off response comprising said requesting terminal address word, said intended receiver terminal address word and said sign-off indicator word.

16. A time division multiple access digital communications system as defined in claim 15 wherein each of said remote subscriber terminals includes:

a. means for receiving said digital frame synchronization signals on said first channel in a one of said time slots, b. means for identifying and selectively receiving the respective ones of said digital request slot assignment signals on said first channel, said selectively received signals having the terminal address word associated with said receiving terminal, c. means for generating and transmitting a one of said digital sign-on request signals on said second channel in a one of said assigned request slots for the respective ones of said terminals, d. means for identifying and selectively receiving the respective ones of said digital sign-on response signals in ones of said time slots on said first channel, said selectively received signals having the terminal address word associated with said receiving terminal, e. means for generating and transmitting said digital data signals on said second channel in a one of said assigned data slots for the respective ones of said terminals, and f. means for identifying and selectively receiving the respective ones of said digital data signals in said time slots on said first channel, said selectively received signals having the terminal address word associated with said receiving terminal, g. means for generating and transmitting said digital sign-off request signal on said second channel in a one of said assigned request slots for the respective ones of said terminals, and h. means for identifying and selectively receiving the respective ones of said digital sign-off response signals on said first channel, said selectively received signals having the terminal address word associated with said receiving terminal.

17. A time division multiple access digital communications system as defined in claim 16 wherein said central control terminal further includes:

means for allocating predetermined numbers of time slots to selected ones of said remote terminals during each of said framed sequences, said predetermined number of slots being for transmission of said sign-on request signals by the respective ones of said selected terminals to direct said central control terminal to link the requesting remote terminal to said signal path, said predetermined number of slots for providing that said control terminal is responsive to said sign-on request signals of the respective ones of said selected terminals during a predetermined proportion of each of said sequences, whereby said allocation of said predetermined number of time slots provides the respective ones of said remote terminals with a predetermined mean time for access to said signal path.

18. A time division multiple access digital communications system as defined in claim 16 wherein said central control terminal further includes:

means responsive to said received sign-on request signals from said requesting remote terminals to allocate to the respective ones of said requesting remote terminals a selected number of time slots during each of said frame sequences to form a communication link between the ones of said requesting terminals and other terminals connected to said path, said selected number of slots for the respective ones of said requesting remote terminals being determined in response to said rate request word in said sign-on request signal, whereby the information capacity of said signal path is allocated to the respective ones of said requesting remote terminals in accordance with the various sign-on request signals.

19. A time division multiple access digital communication system as described in claim 18 wherein each of said remote terminals includes:

a sign-off request means for transmitting a digital sign-off request signal on said path to request the termination of said established communication link, and wherein said central control terminal includes:

means for receiving from requesting remote terminals said transmitted sign-off request signals and for disassociating said selected number of time slots previously allocated to the respective ones of said requesting terminals to terminate said communication link between ones of said requesting terminals and other terminals connected to said path, whereby the previously allocated portions of the information capacity of said signal path is available to be reallocated to the respective one of said requesting remote terminals in accordance with the various sign-on request signals.

20. A time division multiple access digital communications system as defined in claim 16 wherein said central control terminal further includes:

means for identifying a subset of time slots from a set having $2^n$ sequentially numbered time slots in a repetitive framed time sequence, where *n* is an integer, said subset of slots being uniquely defined by a reference slot number, *fsn*, which is representative of a numbered member of said subset in said framed sequence, and a slot spacing number, *m*, where *m* is an integer less than or equal to *n* and is representative of the spacing between members of said subset in said framed sequence, said spacing being equal to $2^m$ slots, said apparatus comprising:

means for generating a binary coded digital *fsn* signal representative of said reference slot number, *fsn*, a reference means for identifying the various ones of said set of $2^n$ sequentially numbered time slots in said repetitive framed time sequence, and for generating a sequential binary coded reference signal associated with each of the successively identified time slots, means for comparing the *m* least significant bits of said successively generated reference signals with the *m* least significant bits of said digital *fsn* signal representative of said reference slot number, *fsn*, means for generating a control signal when said *m* least significant bits of said compared signals exactly match, and for generating no such control signal otherwise, said control signal being coincident with and identifying the members of said subset of time slots.

* * * * *

UNITED STATES PATENT AND TRADEMARK OFFICE

CERTIFICATE OF CORRECTION

PATENT NO. : 3,851,104

DATED : November 26, 1974

INVENTOR(S) : David G. Willard, Michael S. Cogan, Maurice G. Vacherot & John W. Shay It is certified that error appears in the above-identified patent and that said Letters Patent are hereby corrected as shown below:

Column 1, line 14: "control" second occurrence should read --controlling--;

Column 3, line 29: "along" should read --alone--;

Column 3, line 52: "word" should read --words--;

Column 13, line 10: "One" should read --Once--;

Column 14, line 50: "convertr" should read --converter--;

Column 15, line 38: "displayed" should read --displaced--;

Column 19, line 23: "location" should read --locations--;

Column 27, line 18: "slot" should read --slots--;

Column 30, line 25: "reall0cated" should read --reallocated--;

Column 32, line 40: "said receiving terminal." should read --said receiving terminal,--;

Column 33, line 7: "assinged" should read --assigned--;

UNITED STATES PATENT AND TRADEMARK OFFICE

CERTIFICATE OF CORRECTION

PATENT NO. : 3,851,104

DATED : November 26, 1974

INVENTOR(S) : David G. Willard, Michael S. Cogan, Maurice G. Vacherot and John W. Shay It is certified that error appears in the above-identified patent and that said Letters Patent are hereby corrected as shown below:

PATENT & TRADEMARK OFFICE ERRORS (Cont'd.)

Column 34, line 10: "reuest" should read --request--;

Column 35, line 4: "sign-off means" should read --sign-off request means--;

Column 35, line 46: "for comparing" should read --means for comparing--;

Column 38, line 60: "said request remote terminal" should read --said requesting remote terminal--.

Signed and Sealed this

*Twenty-seventh* Day of *March 1979*

[SEAL]

*Attest:*

DONALD W. BANNER

RUTH C. MASON
*Attesting Officer*

*Commissioner of Patents and Trademarks*